United States Patent
Zhou et al.

(10) Patent No.: US 10,283,093 B2
(45) Date of Patent: May 7, 2019

(54) LIGHT FIELD DISPLAY CONTROL METHODS AND APPARATUS, AND LIGHT FIELD DISPLAY DEVICES

(71) Applicant: BEIJING ZHIGU TECH CO., LTD., Beijing (CN)

(72) Inventors: Liang Zhou, Beijing (CN); Lin Du, Beijing (CN)

(73) Assignee: Beijing Zhigu Tech Co., Ltd., Beijing (CN)

( * ) Notice: Subject to any disclaimer, the term of this patent is extended or adjusted under 35 U.S.C. 154(b) by 24 days.

(21) Appl. No.: 15/539,795

(22) PCT Filed: Sep. 10, 2015

(86) PCT No.: PCT/CN2015/089316
§ 371 (c)(1),
(2) Date: Jun. 26, 2017

(87) PCT Pub. No.: WO2016/107209
PCT Pub. Date: Jul. 7, 2016

(65) Prior Publication Data
US 2017/0345402 A1    Nov. 30, 2017

(30) Foreign Application Priority Data

Dec. 29, 2014  (CN) .......................... 2014 1 0838238

(51) Int. Cl.
*G06T 15/00*        (2011.01)
*G09G 5/391*       (2006.01)
(Continued)

(52) U.S. Cl.
CPC .......... *G09G 5/391* (2013.01); *G02B 3/0037* (2013.01); *G06T 7/11* (2017.01); *G09G 3/003* (2013.01);
(Continued)

(58) Field of Classification Search
CPC ........ G06T 7/11; G02B 3/0037; G09G 5/391; G09G 5/10; G09G 2380/02; G09G 3/003;
(Continued)

(56) References Cited

U.S. PATENT DOCUMENTS

| | | | |
|---|---|---|---|
| 6,535,644 B1 * | 3/2003 | Kurapati | H04N 19/63 375/240.01 |
| 7,050,068 B1 * | 5/2006 | Bastos | G06T 11/001 345/611 |

(Continued)

FOREIGN PATENT DOCUMENTS

| | | | |
|---|---|---|---|
| CN | 103885582 A | 6/2014 | |
| CN | 104159025 A | 11/2014 | |

(Continued)

OTHER PUBLICATIONS

Stengel M, Grogorick S, Eisemann M, Eisemann E, Magnor MA. An affordable solution for binocular eye tracking and calibration in head-mounted displays. InProceedings of the 23rd ACM international conference on Multimedia Oct. 13, 2015 (pp. 15-24). ACM.*

(Continued)

*Primary Examiner* — Phu K Nguyen
(74) *Attorney, Agent, or Firm* — Sheppard, Mullin, Richter & Hampton LLP

(57) ABSTRACT

Embodiments of the present application disclose various light field display control methods and apparatus, and various light field display devices. One of the methods comprises: determining a first display region of a display of a light field display device according to target vision adjustment range information; adjusting display pixel density distribution of the display, to cause that display pixel density distribution of the first display region in the display after the adjustment is different from that of another display region of the display; performing sampling processing on a first light field image according to location information of display field (Continued)

pixels of the display after the adjustment, the first light field image being corresponding to vision information in the target vision adjustment range and related to a source image; and displaying, by the light field display device after the adjustment, the first light field image undergone the sampling processing. The embodiments of the present application improve a vision correction precision of viewing an image by naked eyes for users having different vision information in a target vision adjustment range.

37 Claims, 17 Drawing Sheets

(51) Int. Cl.
| | |
|---|---|
| G09G 3/00 | (2006.01) |
| G06T 7/11 | (2017.01) |
| G02B 3/00 | (2006.01) |
| G09G 5/10 | (2006.01) |
| H04N 13/388 | (2018.01) |

(52) U.S. Cl.
CPC .............. *G09G 5/10* (2013.01); *H04N 13/388* (2018.05); *G09G 2320/0626* (2013.01); *G09G 2340/0407* (2013.01); *G09G 2354/00* (2013.01); *G09G 2380/02* (2013.01)

(58) Field of Classification Search
CPC ....... G09G 2340/0407; G09G 2354/00; G09G 2320/0626; H04N 13/388
USPC ......................................................... 345/419
See application file for complete search history.

(56) References Cited

U.S. PATENT DOCUMENTS

| | | | | |
|---|---|---|---|---|
| 7,495,638 | B2* | 2/2009 | Lamvik | G02B 27/0172 345/76 |
| 7,777,766 | B2* | 8/2010 | Okumura | G09G 5/00 345/660 |
| 8,094,965 | B2* | 1/2012 | Shimizu | G06K 9/4619 382/275 |
| 8,314,814 | B2* | 11/2012 | Gibbons | G02B 6/06 345/33 |
| 8,698,859 | B2* | 4/2014 | DeLuca | G09G 5/14 345/102 |
| 9,123,266 | B2* | 9/2015 | Bastani | G09F 13/04 |
| 9,368,070 | B2* | 6/2016 | Jepsen | G06F 3/1446 |
| 9,690,099 | B2* | 6/2017 | Bar-Zeev | G02B 27/017 |
| 9,727,991 | B2* | 8/2017 | Guenter | G06T 11/40 |
| 2004/0227703 | A1 | 11/2004 | Lamvik et al. | |
| 2010/0289819 | A1 | 11/2010 | Singh et al. | |
| 2013/0063492 | A1 | 3/2013 | Washington et al. | |
| 2013/0286053 | A1 | 10/2013 | Fleck et al. | |
| 2014/0168783 | A1 | 6/2014 | Luebke et al. | |
| 2014/0184475 | A1* | 7/2014 | Tantos | H03M 13/356 345/8 |
| 2014/0327750 | A1 | 11/2014 | Malachowsky et al. | |
| 2017/0287447 | A1* | 10/2017 | Barry | G02B 27/017 |

FOREIGN PATENT DOCUMENTS

| | | |
|---|---|---|
| CN | 104469343 A | 3/2015 |
| CN | 104469344 A | 3/2015 |
| EP | 2073191 A | 6/2006 |

OTHER PUBLICATIONS

International Search Report and Written Opinion for Application No. PCT/CN2015/089316, dated Nov. 3, 2015, 7 pages.

Hirsch et al., "A Compressive Light Field Projection System," ACM Transactions on Graphics, 2014, 12 pages.

Huang et al., "Eyeglasses-free Display: Towards Correcting Visual Aberrations with Computational Light Field Displays," Jul. 2014, ACM Transactions on Graphics, vol. 33, No. 4, Article 59, 12 pages.

Lanman et al., "Near-Eye Light Field Displays," ACM Transactions on Graphics, 2013, 10 pages.

Maimone, A., "Focus 3D: Compressive Accommodation Display," ACM Transactions on Graphics, 2013, 12 pages.

* cited by examiner

LIGHT FIELD DISPLAY CONTROL METHODS AND APPARATUS, AND LIGHT FIELD DISPLAY DEVICES

CROSS-REFERENCE TO RELATED APPLICATIONS

This application is a National Phase Application of International Application No. PCT/CN2015/089316, filed on Sept. 10, 2015, which claims the benefit of priority to Chinese Patent Application No. 201410838238.1, filed on Dec. 29, 2014, and entitled "Light Field Display Control Methods and Apparatus, and Light Field Display Devices". Both of the above-referenced applications are incorporated in the present application by reference herein in their entirety.

TECHNICAL FIELD

The present application relates to the field of light field display technologies, and in particular, to various light field display control methods and apparatus and various light field display devices.

BACKGROUND

The light field display technology has been proposed at the initial of the $20^{th}$ century, and two representative implementation manners thereof are: an implementation manner based on a Lenslet array by Lippmann in 1908, and an implementation manner based on Parallax Barriers by Ives in 1903.

In recent years, along with diversified requirements of consumer electronic products on display devices, the light field display technology is applied to various scenarios and devices, such as, a 3D display, a wearable device, and a light field display for vision correction. The light field display technology can implement a relatively flexible display effect by using a hardware structure similar to the conventional display technology, such as light field 3D display, light field projection display, light field near-to-eye display on a wearable device, and vision correction of light field display. Therefore, along with gradual matching of requirements of calculation capabilities of electronic devices, display resolution and the light field display technology on hardware resources, researches on the light field display technology in the field are increasingly intensive and deep, so as to better meet diversified application requirements of users.

SUMMARY

A brief description of the present application is provided hereinafter, so as to provide basic understanding of the present application in some aspects. It should be understood that this description is not an exhaustive description of the present application. It is not intended to determine key or important parts of the present application, nor intended to limit the scope of the present application. An objective is merely providing some concepts in a simplified form, and this is used as a preorder of more detailed descriptions made later.

The present application provides various light field display control methods and apparatus, and various light field display devices.

In one aspect, an embodiment of the present application provides a light field display control method, comprising:

determining a first display region of a display of a light field display device according to target vision adjustment range information;

adjusting display pixel density distribution of the display, to cause that display pixel density distribution of the first display region in the display after the adjustment is different from that of another display region of the display;

performing sampling processing on a first light field image according to location information of display pixels of the display after the adjustment, the first light field image being corresponding to vision information in the target vision adjustment range and related to a source image; and displaying, by the light field display device after the adjustment, the first light field image undergone the sampling processing.

In another aspect, an embodiment of the present application further provides a light field display control apparatus, comprising:

a display region determining module, configured to determine a first display region of a display of a light field display device according to target vision adjustment range information;

a display pixel density distribution adjusting module, configured to adjust display pixel density distribution of the display, to cause that display pixel density distribution of the first display region in the display after the adjustment is different from that of another display region of the display;

an image sampling processing module, configured to perform sampling processing on a first light field image according to location information of display pixels of the display after the adjustment, the first light field image being corresponding to vision information in the target vision adjustment range and related to a source image; and a light field display module, configured to display, by the light field display device after the adjustment, the first light field image undergone the sampling processing.

In still another aspect, an embodiment of the present application provides a light field display device, comprising:

a display;

a lenslet array; and a light field display control apparatus provided by any one of the embodiments of the present application, the light field display control apparatus being in communication connection with the display.

The technical solution provided in the embodiment of the present application determines the first display region of the display of the light field display device according to the target vision information adjustment range (equivalent to the target refocusing range), and adjusts contributions of light field image information display by different display regions of the display on the refocusing precision in the refocusing range by adjusting the display pixel density distribution of the display region of the display. For example, by improving the display pixel density of the first display region, the abundance of the light field image information displayed by the first display region is improved, thereby improving the refocusing precision of the refocusing range (the target vision adjustment range) corresponding to the first display region, to cause that there are more refocused focal points within the target vision adjustment range, thereby improving the precision of vision correction on viewing an image by naked eyes of users having different vision information in the target vision adjustment range.

These and other advantages of the present application will be more obvious through detailed descriptions of optional embodiments of the present application in combination with the accompanying drawings.

BRIEF DESCRIPTION OF THE DRAWINGS

The present application may be better understood with reference to the descriptions made through the accompanying drawings, and in all the accompanying drawings, the same or similar reference numerals are used to indicate the same or similar components. The accompanying drawings together with the following detailed descriptions are comprised in the specification and form a part of the specification, and are used to further describe the optimal embodiments of the present application and explain the principles and advantages of the present application. In the accompanying drawings.

Figure 1A:
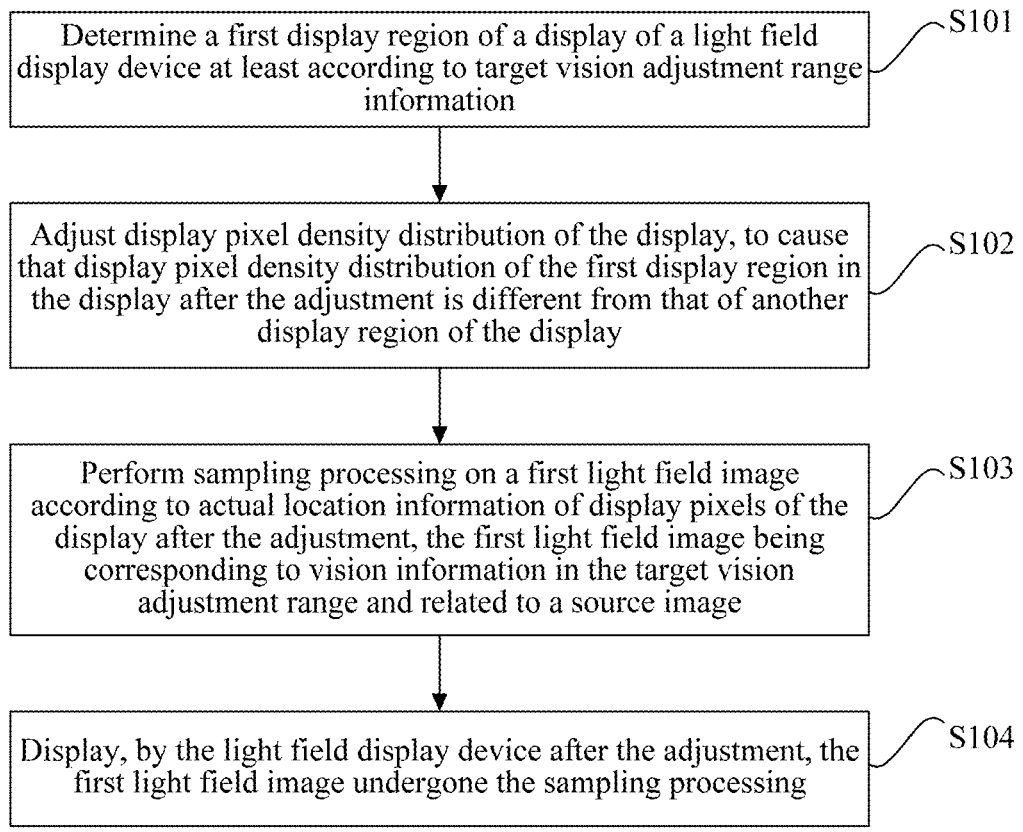
FIG. 1a is a flow chart of a light field display control method according to an embodiment of the present application.

A person skilled in the art should understand that elements in the accompanying drawings are shown merely for simplicity and clarity, and are not necessarily drawn according to the proportion. For example, sizes of some elements in the accompanying drawings may be enlarged relative to other elements, so as to facilitate understanding on the embodiments of the present application.

DETAILED DESCRIPTION

Exemplary embodiments of the present application are described in detail in the following through the accompanying drawings. For clarity and simplicity, not all features of actual implementation manners are described in the specification. However, it should be understood that in a process of developing any actual embodiment, many decisions specific to the implementation manner must be made to implement specific objectives of developers, for example, meeting limitation conditions related to a system and service, and the limitation conditions may vary according to different implementation manners. Moreover, it should be further understood that, although the development work may be very complicated and time consuming, the development work is merely a routine task for a person skilled in the art and benefited from the content of the present disclosure.

Here, it should be further noted that, to avoid that the present application is vague due to unnecessary details, merely apparatus structures and/or processing steps closely related to the solution of the present application are described in the accompanying drawings and the specification, and expressions and descriptions on parts and processing that are less related to the present application and known by a person of ordinary skill in the art are omitted.

Specific implementation manners of the present application are further described in detail through the accompanying drawings (the same reference numerals in several accompanying drawings indicate the same elements) and embodiments. The following embodiments are used to describe the present application, but are not intended to limit the scope of the present application.

Persons skilled in the art should understand that terms such as "first" and "second" in the present application are merely used to distinguish different steps, devices, modules or the like, and the terms neither represent any specific technical meanings nor indicate necessary logic orders of them.

FIG. 1a is a flow chart of a light field display control method according to an embodiment of the present application. The light field display control method provided in the embodiments of the present application may be executed by a certain light field display control apparatus, and the light field display control apparatus can perform display control on an image by executing the light field display control method in a process involving an application comprising, but not limited to, image presentation and video playback. The presentation form of the device of the light field display control apparatus is not limited, for example, the light field display control apparatus may be a certain independent component, and the component cooperatively communicates with a light field display device comprising a display; or the light field display control apparatus may be integrated in a display device comprising a display as a certain functional module, and the light field display device may comprise, but not limited to, a device having a light field display capability and comprising the display, such as a television, a computer, a camera, a mobile phone, and a video recorder.

Specifically, as shown in FIG. 1a, a light field display control method provided in the embodiment of the present application comprises:

S101: Determine a first display region of a display of a light field display device at least according to target vision adjustment range information.

The target vision adjustment range is generally used to represent vision information range of a user in which a focused image can be viewed in a certain viewing distance. The vision information range may comprise, but not limited to, a dioptre range of the user, and dioptre information in the dioptre range may indicate, but not limited to, a distance between an eye-ground actual focal plane and a retina of an eye of the user when the user viewing the image, which is equivalent to converting the dioptre information into distance information.

In a case that an influence possibly generated by other factors on viewing of an image focus by the user is not considered, users having different vision information may have different clearness when viewing a certain image (for example, a conventional two-dimensional display image) in the same viewing distance, a user having normal vision may view a clear image, but a naked eye of a user whose vision needs to be corrected (such as far-sighted or short-sighted) may view an out-of-focus blurred image. Specifically, when the user viewing an image, a human eye is equivalent to a lens. Light rays of a display image are converged by the human eye to image at the eye ground. Users having different vision information have different user eye-ground imaging positions. For example, a position that may clearly image for the user having normal vision is a retina of the user, and in the same condition, if the user whose vision needs to be corrected intends to form a clear image at the eye ground, an actual focal plane is not always the retina, but is a certain position before or after the retina, and the users generally need to wear suitable vision correction devices (such as short-sighted glasses or far-sighted glasses) to change the direction of display light rays to image clearly on the retina. For a user whose vision needs to be corrected, an image formed at the retina is generally blurred and not clear if not wearing a suitable vision correction device.

Relative to a conventionally display two-dimensional image, the light field display image sacrifices the spatial resolution of a display image, but supports acquiring of respective re-focused images on retinas of human eyes using information of the light field image by users adapting to different dioptres in a certain imaging range. The re-focused images have the same or similar (not completely the same in some circumstances) content and are clear for the users having corresponding dioptre vision information, which enables the users whose visions need to be corrected to view the content of the displayed image clearly without wearing any vision correction device on a certain probability.

The refocusing precision may be used to represent a distance interval of obtaining a refocused image within a certain imaging range, and the imaging range may be referred to as a refocusing range. In the refocusing range corresponding to the target vision adjustment range, if the refocusing precision is large, a new refocused image may be acquired through a human eye at a small distance (equivalent to a small dioptre difference), and on the contrary, if the refocusing precision is small, a new refocused image may be acquired through a human eye at a large distance (equivalent to a large dioptre difference). If the actual vision information of the user actually viewing the light field image is within the target vision adjustment range, in the same viewing distance, a clear or relatively clear refocused image may be formed on a retina of the eye of the user according to the information of the light field display image, and the refocused image and the image viewed by the user having other vision information may be respectively corresponding to two refocused images having different refocused focal points within the refocusing range; therefore, the viewed content may be the same or similar.

If the refocusing precision of the refocusing range corresponding to the target vision adjustment range is high, a smaller difference of the vision information in the target vision adjustment range can also correspond to a refocused image, which is equivalent to that actual focal planes of human eyes of different vision information are adjusted to retinas of the human eyes by using the refocusing property of the light field display image, to cause that when different users having vision information in the target vision adjustment range viewing the light field display image at the same distance, the probability of viewing a refocused clear or relatively clear image by naked eyes (without wearing any vision corrosion device) is larger. In other words, refocused focal points in the refocusing range that can acquire a refocused image are discrete, the larger the refocusing precision is, the more the refocused focal points in the refocusing range are. A refocused focal point is equivalent to vision information (or an imaging position) corresponding to a different actual focal plane position, for example, if the refocusing precision is small, a refocused image can be obtained every 0.5 dioptre, and if the refocusing precision is large, a refocused image can be obtained every 0.2 dioptre. Therefore, if the refocusing precision in the refocusing range corresponding to the target vision adjustment range is changed, the vision correction precision in the target vision adjustment range of viewing an image by the user having the vision information in the adjustment range may be changed.

S102: Adjust display pixel density distribution of the display, to cause that display pixel density distribution of the first display region in the display after the adjustment is different from that of another display region of the display.

Figure 2A:
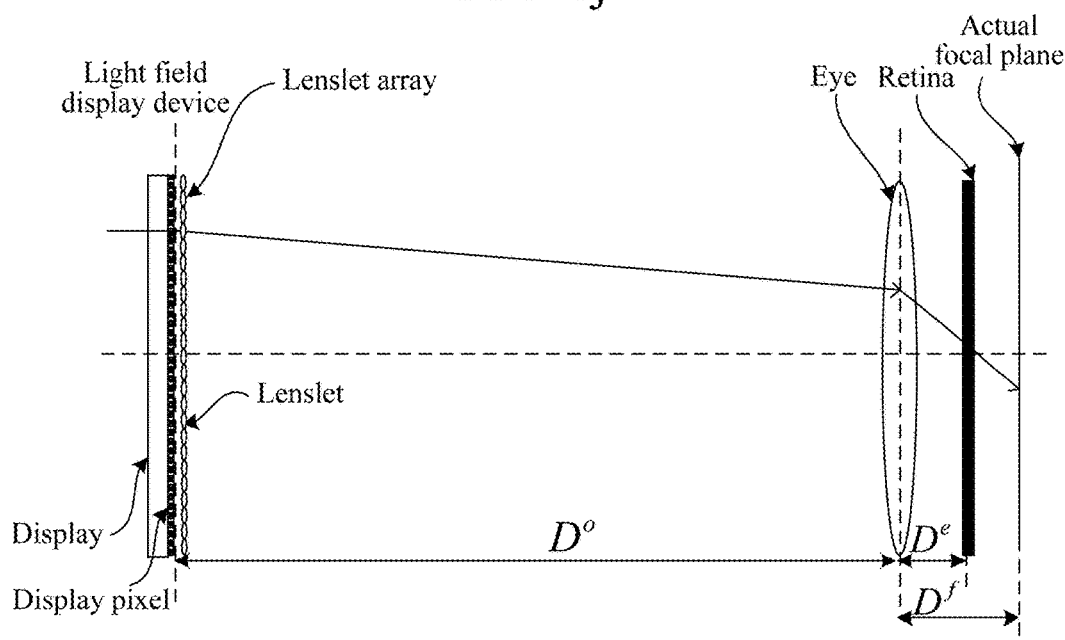
FIG. 2a is a first example of an optional optical path displayed by a light field according to an embodiment of the present application.

Different from the conventional display device, the light field display device may be provided with a lenslet array near the display. As shown in FIG. 2a, the lenslet array may also be referred to as a micro lens array, and comprises multiple lenslets (or referred to as micro lenses) distributed in an array. A propagation direction of light ray from the display is changed by at least one lenslet in the lenslet array, and the light ray having the propagation direction changed is converged through an eye of the user (similar to a lens) to image on a retina of the user. The display comprises multiple display regions, one display region comprises multiple display pixels and one display region is corresponding to a lenslet. In other words, in the light field display device, the lenslet array and the display pixels of the display have a one-to-more correspondence, and information of the same part of a to-be-displayed image at different views may be displayed by using multiple display pixels of the display, thereby implementing abundant display properties of a light field image.

However, when a light field image implements abundant and flexible display effects, a spatial resolution of the displayed light field image is reduced relative to the conventional display technology. For example, it is assumed that the lenslet array comprises M*N lenslets, the resolution of the display is A*B, and A*B pixels of the display are divided into M*N display regions (A is greater than M, and B is greater than N). In a case of a display region of a display corresponding to a lenslet, light rays emitted by display pixels of the display region have their propagation directions being changed by the lenslet corresponding to the display region, and then are converged in the eye of the user. Each display region comprises X*Y pixels, the spatial resolution of the displayed light field image is corresponding to distribution of lenslets of the lenslet array, being M*N, and the spatial resolution is lower than the resolution A*B of the display. Similarly, in a case that one lenslet corresponds to multiple display regions of the display, a spatial resolution of a light field image displayed by the display is generally between M*N and A*B, and correspondingly, a resolution A*B of the display is low. Light rays emitted by display pixels of different display regions have their propagation directions being changed by the corresponding lenslet, and then are converged in the eye of the user, so as to form a light field image relative to the user. According to abundance of light field image information, the light image finally presented to the user may be a refocused image directed to the vision information of the user, and the like. However, generally, the display light field image has a lower clearness than an image displayed by using the conventional display technology.

In the embodiment of the present application, the display of the light field display device is a pixel density adjustable display, and the display may comprise, but not limited to, a flexible display. The flexible display at least comprises a flexible substrate and multiple display pixels formed on the flexible substrate, wherein the flexible substrate may have various changes such as stretching and bending when meeting a certain condition, so as to adjust display pixel density distribution thereof. The display pixel may comprise, but not limited to, at least one light emitting unit. The light emitting unit may comprise, but not limited to a light emitting diode (LED) light emitting unit and an organic light emitting diode (OLED) light emitting unit. A light emitting color of the light emitting unit may be determined according to an actual requirement, and the light emitting unit may comprise, but not limited to, one or more light emitting sub-units; the light emitting sub-unit may comprise an LED light emitting sub-unit and an OLED light emitting sub-unit. The multiple light emitting sub-units may comprise, but not limited to, LED light emitting sub-units and OLED light emitting sub-units having different colors such as red (R), green (G) and blue (B).

In combination with such a property that the display pixel density distribution of the display is adjustable, the embodiment of the present application may adjust the display pixel density distribution of the display of the light field display device according to an actual requirement, to cause that the display pixel density distribution of the first display region in the display after the adjustment is different from that of another display region of the display. The "different from" comprises being greater than or less than. Specifically, as shown in the first situation, if it is intended to improve a refocusing precision of a refocusing range corresponding to the target vision adjustment range, the display pixel distribution of the display may be adjusted, to cause that the actual display pixel density of the first display region after the adjustment is greater than that of another display region of the display, so as to improve the abundance of light field image information displayed by the first display region in a process of the light field display, thereby further increasing the probability of acquiring more refocused images based on more abundant light field image information. Another situation may be considered as a situation complementary to the above situation to some extent. For example, if it is intended to reduce a refocusing precision of a refocusing range corresponding to the target vision adjustment range, the display pixel distribution of the display may be adjusted, to cause that the actual display pixel density of the first display region after the adjustment is less than that of another display region of the display, so as to reduce the abundance of light field image information displayed by the first display region in a process of the light field display, thereby further using a part of display pixels of the display to display other light field image information, so as to improve the utilization of the display pixels.

The embodiment of the present application is described in the following by using the first situation as an example, and it is understandable that, the solution of the embodiment of the present application is also applicable to another situation, which is not repeated herein.

S103: Perform sampling processing on a first light field image according to actual location information of display pixels of the display after the adjustment, the first light field image being corresponding to vision information in the target vision adjustment range and related to a source image.

The source image may be, but not limited to, a two-dimensional clear image having a high resolution. A light field image corresponding to the source image, if being viewed directly from the display of the light field display device, is generally a blurred image, and the blurred image is "divided" into multiple sub-images. Each sub-image (which may be referred to as a light field sub-image) is displayed on at least one display region of the display. In some situations, light field sub-images displayed by different display regions are different. In some situations, for light field sub-images displayed by adjacent display regions, display content in a region within a certain range close to the boundary may be partially overlapped, and the overlapped content is used to remove aberration generated when light rays of different light field sub-images have their propagation directions being changed by different lenslets and then converged on a retina of the human eye, to cause that a display position of the actual display content is adjusted within a range before or after the screen of the display (equivalent to that the imaging position of the human eye of the user is adjusted within a range before and after the retina of the human eye). Therefore, the light field image displayed by the display and viewed by the human eye through the lenslet array is a clear image having successive content.

In an actual application, light field capturing or pre-processing may be performed on the source image according to vision information in the target vision adjustment range, so as to obtain the first light field image, to cause that when an image of the first light field image is acquired at the retina of the human eye (or at a certain position before or after the retina) by using the display and the lenslet array according to the reversibility principle of an optical path, the image is an image with aberration being removed. In other words, the light field display may be considered as a reversible process of an optical path of light field capturing to some extent. The to-be-displayed first light field image and display pixels of the display have a certain correspondence, and actual positions of some display pixels of the display after the adjustment may be changed; therefore, sampling processing may be performed on the first light field image according to the actual positions of the display pixels of the display after the adjustment, to cause that the first light field image undergone the sampling processing is corresponding to the actual positions of the display pixels of the display. The specific sampling method is not limited in the embodiment of the present application. For example, but not limited to, down sampling may be performed on the first light field image according to actual location information of the display pixels of the display after the adjustment.

S104: Display, by the light field display device after the adjustment, the first light field image undergone the sampling processing.

Figure 2B:
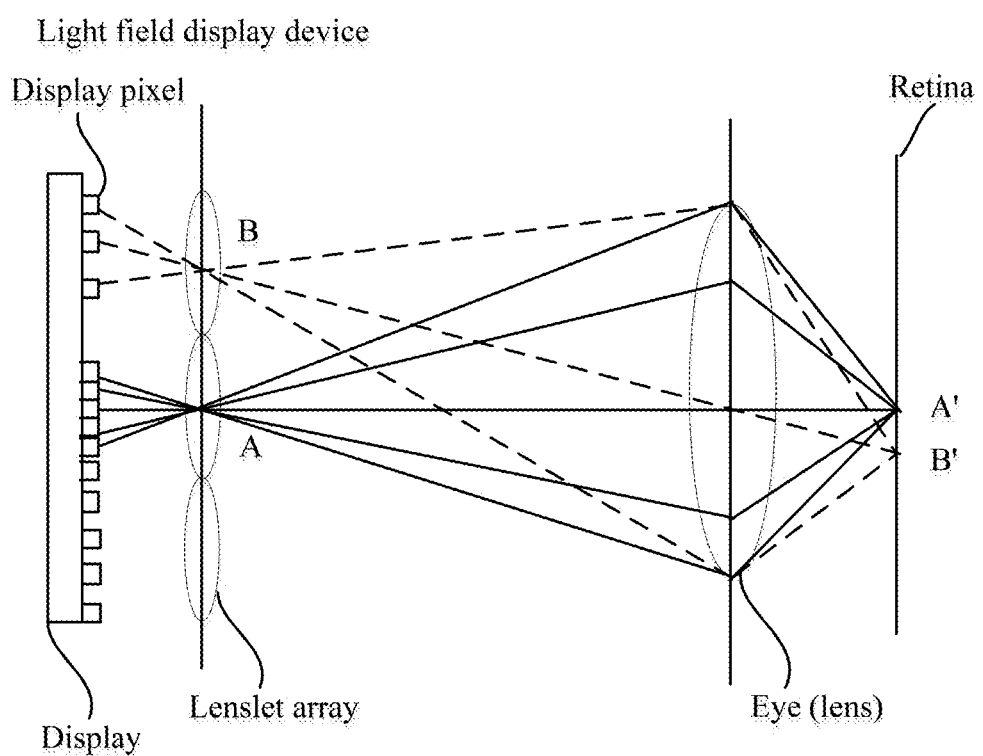
FIG. 2b is a second example of an optional optical path displayed by a light field according to an embodiment of the present application.
Figure 2C:
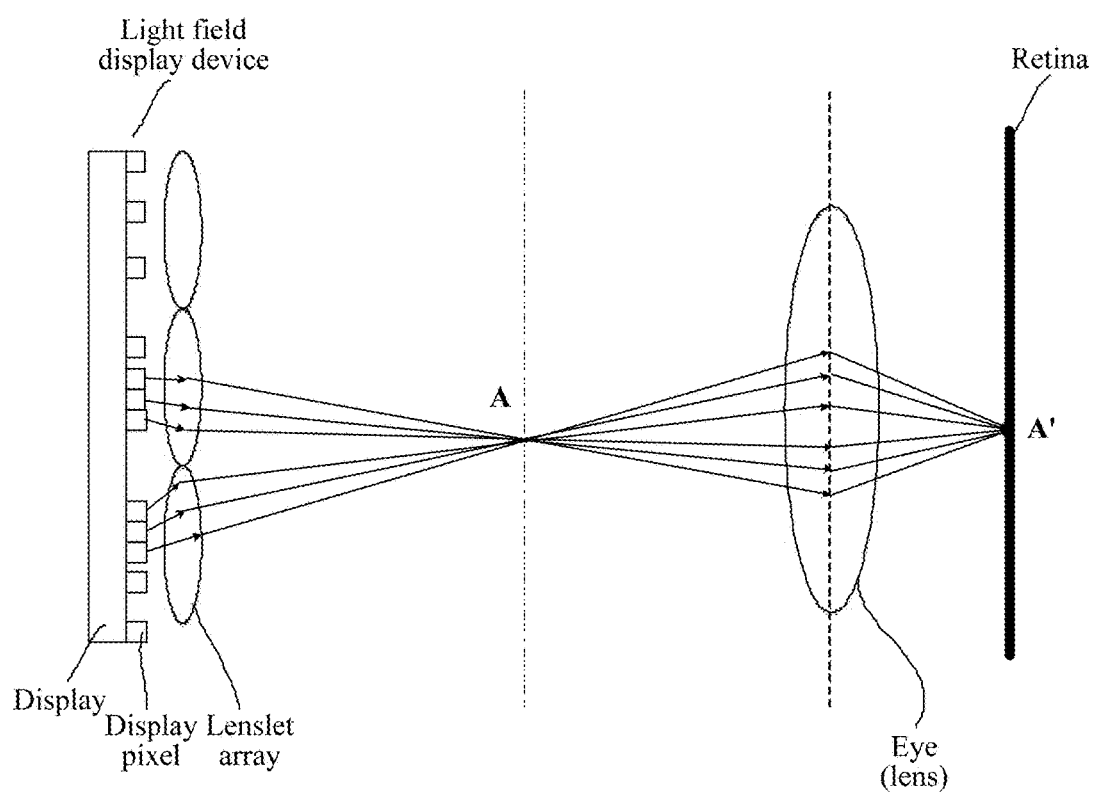
FIG. 2c is a third example of an optional optical path displayed by a light field according to an embodiment of the present application.

After the display of the light field display device is adjusted, the display pixel density of the display is distributed non-uniformly. A part of display region (such as the first display region) of the display after the adjustment has more pixels to display information of the light field image, and a part of display region (such as another display region) has less display pixels to display the information of the light field image, as shown in FIG. 2b and FIG. 2c. Light field image information displayed by different display regions may have different contributions on a refocusing precision in different refocusing ranges.

The technical solution provided in the embodiment of the present application determines the first display region of the display of the light field display device according to the target vision information adjustment range (equivalent to the target refocusing range), and adjusts contributions of light field image information display by different display regions of the display on the refocusing precision in the refocusing range by adjusting the display pixel density distribution of the display region of the display. For example, by improving the display pixel density of the first display region, the abundance of the light field image information displayed by the first display region is improved, thereby improving the refocusing precision of the refocusing range (the target vision adjustment range) corresponding to the first display region, to cause that there are more refocused focal points within the target vision adjustment range, thereby improving the precision of vision correction on viewing an image by naked eyes of users having different vision information in the target vision adjustment range.

Figure 2D:
FIG. 2d is a first example of a light field image viewed by a naked eye of a user through a light field display device before adjustment according to an embodiment of the present application.
Figure 2E:
FIG. 2e is a first example of a light field image viewed by a naked eye of a user through a light field display device after adjustment according to an embodiment of the present application.

For example, it is assumed that the vision information of the user falls within the target vision adjustment range, an image viewed by the user by using the light field display device before the adjustment is a blurred image, as shown in FIG. 2d, and in the same viewing condition, an image viewed by naked eyes of the user by using the light field display device after the adjustment is a clearer refocused image, as shown in FIG. 2e.

Optionally, the light field display control method further comprises: determining the target vision adjustment range according to the vision information of the user. The solution may comprise the vision information of the user into the target vision adjustment range, to cause that when the user views the light field display image by using the display after the adjustment, a refocused image correctly corresponding to the vision information thereof or having less correspondence error may be obtained, and the user views a clear or relatively clear image.

Optionally, the light field display control method further comprises: pre-processing the source image according to the vision information of the user to obtain the first light field image. The solution may perform the pre-processing on the content of the source image directed to the vision information of the user, and convert the source image into a light field image displayed by substantially restoring the content by using the light field display device according to the reversibility principle of an optical path. The displayed light field image is a clear image having an aligned focal point for the user. The solution can not only be applied to pre-processing scenario a light field image corresponding to the source image viewed by a user having normal relative vision, and can also be applied to pre-processing of a light field image corresponding to the source image viewed by a user having relative vision that needs to be corrected (such as far-sighted or short-sighted), and the implementation manner thereof is flexible.

An optional implementation manner of pre-processing the source image to obtain the light field image is described by using an equivalent optical path shown in FIG. 2a as an example. Optionally, the source image may be pre-processed in a manner of constructing a conversion matrix according to the vision information of the user, so as to obtain a light field image having a certain aberration. The aberration may be counteracted through change of the optical path of the lenslet array to form a re-focused image relative to the vision information. A simplified physical model is described as follows:

$$i = P \times l^d \tag{1}$$

In the above equation, i represents the source image, $l^d$ represents a to-be-solved pre-processing image, and P represents a conversion matrix determined according to the vision information of the user, wherein:

$$P = \begin{pmatrix} -\frac{D^o}{D^e} & D^o \Delta \\ 0 & 1 \end{pmatrix} \quad (2)$$

In the above equation:

$$\Delta = \frac{1}{D^e} - \frac{1}{f} + \frac{1}{D^o} \quad (3)$$

wherein, $D^o$ represents a distance between a pupil of an eye of the user and a screen of the display of the light field display device, $D^e$ represents a distance between the pupil of the eye of the user and a retina, and f represents a lens focal length of an eyeball. If a certain user is a user having normal vision, an actual focal plane of the eye is generally the retina when the user views an object clearly by naked eyes; and if a certain user has vision that needs to be corrected, such as a short-sighted user or a far-sighted user, when the user views an object by naked eyes, an actual focal plane of imaging of the object in the eye of the user is generally not on the retina, for example, a certain plane before or after the retina is the actual focal plane of the user. A distance between the pupil of the user to the actual focal plane is represented as $D^f$:

$$D^f = \frac{fD^o}{D^o - f} \quad (4)$$

The pre-processed light field image, that is, $I^d$, related to the source image may be obtained according to the above equations. The light field display control apparatus sends the light field image obtained after the pre-processing to the display of the light field display device for display, and the light field image viewed by the user by using the display is blurred. For example, if the light field image is divided into multiple sub-images (that is, light field sub-images), each light field sub-image is corresponding to at least one lenslet of the lenslet array, and in this way, adjacent two light field sub-images may have a part of content being repeated, which is an effect of light field information overlapping. Propagation directions of light rays displayed by the display are changed by the lenslet array disposed adjacent to the display, and light rays having their propagation directions being changed by the lenslets in the lenslet array reimage, and the reimaged image counteracts the aberration introduced in the pre-processing process, and therefore, the focal point is aligned for the user having the vision information. In other words, the source image is pre-processed and is displayed by the lenslet array to form a refocused image relative to the source image, and when the user having the vision information views the image by using the lenslet array, the viewed image can be clearly imaged on the retina of the user; therefore, the user having normal vision or the user having vision that needs to be corrected can view a clear image having the focal point aligned by using naked eyes (that is, the user having vision that needs to be corrected does not need to wear a vision correction device) through the lenslet array. The solution pre-processes the content of the source image according to the vision information of the user, to cause that the light field image obtained by pre-processing is more matching with the vision information of the user, thereby improving the viewing effect of the user. The vision information may comprise, but not limited to $D^o$, $D^e$, f, $D^f$ and the like. The vision information may be acquired at once, and may also be acquired dynamically in a process of image displaying, so as to implement dynamic adjustment of a processing result by tracking eyes of the user, to cause that the light field image displayed when the eye viewing position of the user is changed is a certain focal point aligned image relative to the current viewing position of the user as much as possible, thereby improving the viewing effect and improving the user experience. Moreover, the solution also improves the probability of a user having vision information similar to the vision information of the user in the target vision adjustment range acquiring a clear refocused image.

In the technical solution provided in the embodiment of the present application, a first display region that affects a refocusing precision in a refocusing range corresponding to the target vision adjustment range may be determined according to an actual requirement.

Figure 3:
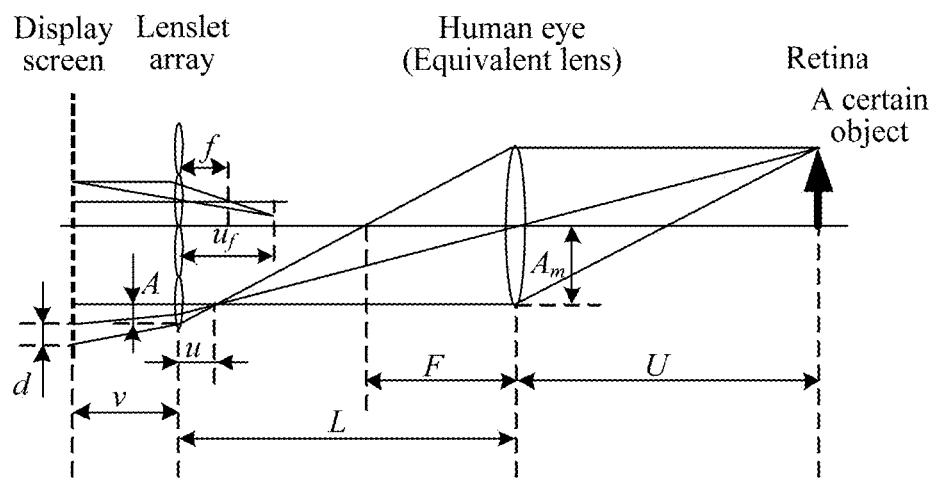
FIG. 3 is a second example of an optional optical path displayed by a light field according to an embodiment of the present application.

In an optional implementation manner, the first display region may be determined according to the target vision adjustment range, for example, a to-be-adjusted first display sub-region respectively in at least one display region of the display may be determined as the first display region according to the target vision adjustment range. An optional optical path of light field display may be obtained with reference to FIG. 3. Light rays emitted by various display pixels of a certain display region of the display are converged to a lenslet in the lenslet array corresponding to the displaying region and are split by the lenslet, and the split light rays are converged by the human eye (an equivalent lens) to image at the eye ground. Light rays emitted by different display pixels of a certain display region of the display comprise light ray information of different views, and when a human eye views the light field image by using the lenslet array, it is equivalent to that the human eye performs an integration processing on information such as light rays of different views and the light intensity to form different images at the eye ground. The refocusing precision of the refocusing range is related to the display pixels of the display region, and a refocused image of a certain refocused focal point in the refocusing range (that is, an image that can be viewed by a user having certain vision information in the target vision adjustment range) may be considered as an integration of display light rays of the display pixels in a region corresponding to a radius of a circle of confusion corresponding to the refocused focal point. In other words, light rays in display pixel regions of different sizes of the display may be converged to one point when being imaged in the human eye, a certain point converged at the retina of the human eye or a specific position before the retina or after the retina, which depends on the size of the display pixel region corresponding to the converged point. If the display pixel density in the display region corresponding to the refocusing range is large, the refocusing precision of the refocusing range is high, and more refocused focal points may be obtained. In other words, more vision information of the refocusing image may be obtained in the target vision adjustment information range, and if the actual vision information of the user is the same or similar to the vision information of a refocused image that can be obtained, the probability that the user can view a refocused image is large. Display regions of different sizes may be represented by using regions of different radiuses of circles of confusion, and according to a typical geometrical optics theory, the radius of the circle of confusion is represented as follows:

$$d = \frac{Afu_f}{u_f - f}\left(\frac{1}{u_f} - \frac{1}{u}\right) \quad (5)$$

In the above equation, A is the radius of the lenslet, f is a focal length of the lenslet, $u_f$ is a distance from a focal plane of the lenslet to a centre of the lenslet, and u is a distance from a real image or virtual image to the centre of the lenslet (the real image is a positive value, and the virtual image is a negative value).

An imaging equation of a main lens is as follows:

$$\frac{1}{F} = \frac{1}{U} + \frac{1}{V} = \frac{1}{U} + \frac{1}{L-u} \quad (6)$$

wherein: U is a distance from a plane (a refocusing plane) where a refocused focal point of a certain refocused image that can be acquired based on the light field image and a human eye (equivalent to a lens); F is a focal length of the human eye (equivalent to a lens), and L is a distance from an optical centre of the human eye (equivalent to a lens) to an optical centre of the lenslet.

An imaging equation of a lenslet is as follows:

$$\frac{1}{f} = \frac{1}{u_f} + \frac{1}{v} \quad (7)$$

wherein, v is a distance from a certain pixel point of the display region in the display corresponding to the lenslet to the lenslet.

The following equation may be obtained according to the equations (1), (2) and (3):

$$\frac{1}{U} = \frac{1}{F} + \frac{1}{\frac{1}{\frac{1}{f} - \frac{1}{v}\left(1 + \frac{d}{A}\right)} - L} \quad (8)$$

Figure 4A:
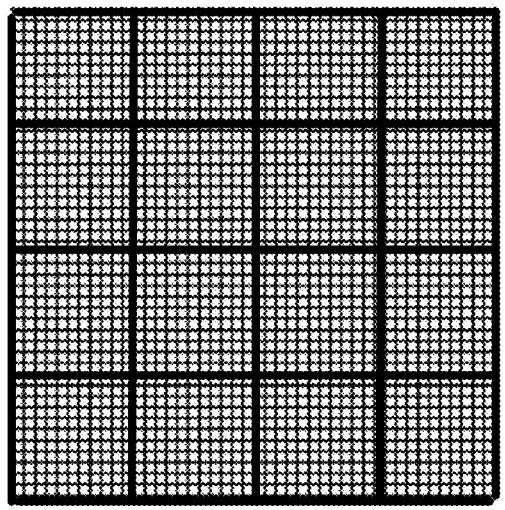
FIG. 4a is an example of display pixel density distribution of a display before adjustment according to an embodiment of the present application.
Figure 4B:
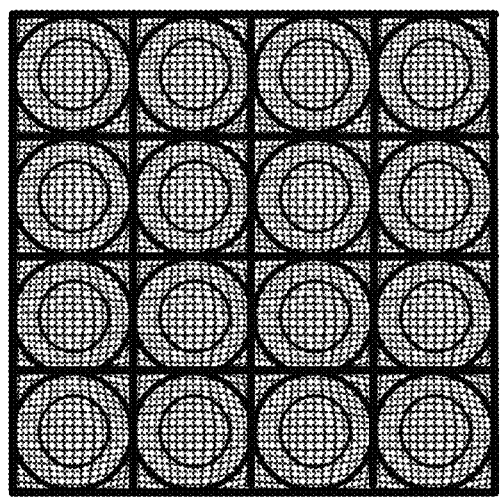
FIG. 4b is an example of display pixel density distribution of a display after adjustment according to an embodiment of the present application.

It can be seen that, after an optical parameter of the light field display device is determined, U and d have a certain correspondence. The higher the display pixel density in the d region is, the more abundant the light field information displayed by the region is, and the large the refocusing precision is, which is conducive to improving the vision correction precision of viewing an image by users having different vision information with naked eyes in the target vision adjustment range; and vice versa. The target information adjustment range may be represented as the refocusing range, the radial range of the circle of confusion may be calculated according to the refocusing range, and a region corresponding to the radial range of the circle of confusion is the to-be-adjusted first display sub-region in the display region. To improve the adjustment precision within a certain U range, display pixels of the circle of confusion in the range may be concentrated at a certain local area of the circle of confusion, for example, the first display sub-region may be represented as an annular region having a certain radial width in the display region, and an example of comparison of pixel density distributions of the display region of the display before and after the adjustment is specifically shown in FIG. 4a and FIG. 4b. In some situations, for example, in a situation that contents of light field sub-images displayed by different display regions are not overlapped, before and after the display density pixel adjustment is performed on the display region, the distribution of the display pixel density of the display region may be adjusted while keeping the display pixels of the display region unchanged, and therefore, the refocusing precision of the light field sub-image corresponding to the display region in the refocusing range corresponding to the target vision adjustment range may be adjusted.

In another optional implementation, the first display region may be determined in combination with the target vision adjustment range and a local region of the source image, that is, the first display region may be determined according to the target vision adjustment range and the first region of the source image, and the first region is a part of the source image.

For example, multiple second light field images may be determined according to target vision adjustment range, and one of the second light field images is corresponding to vision adjustment information in the target vision adjustment range and is related to the source image. Determine light field sub-image information corresponding to the first region in the multiple light field images; and determine a display region that affects light field displaying of the light field sub-image information in the display as the first display region.

When a certain source image (for example, a two-dimensional non-light field image) intends to perform light field display, content of the source image may be pre-processed to obtain a light field image corresponding to the source image, and the light field image is generally blurred if being viewed by using the display (without using the lenslet array). In some situations (such as the situations that the screen of the display is on the focal plane of the lenslet or is relatively close to the focal plane of the lenslet, as shown in FIG. 2b), in order that the light field image has its light propagation direction being changed by the lenslet array and then forms a clear image in the human eye, contents of local regions of the light field image have certain repetition, for example, display contents of light field sub-images displayed by two adjacent display regions of the display are partially overlapped in a region within a certain range near the boundaries. After the first region of the source image is determined, light field sub-image information matching with the content of the first region in each of the light field images may be determined respectively according to a correspondence between the first region and each light field image of the source image, and a collection of the determined regions is the first display region of the embodiment of the present application. The light field images may be multiple light field images related to the source image and determined according to various different pieces of vision information in the target vision adjustment range, and a determination manner of the light field image may use, but not limited to, the method of the above equation (1) to the equation (4). The multiple different pieces of vision information may be several pieces of specific vision information selected from the target vision adjustment range according to a predetermined rule, or multiple pieces of matching vision information selected in the target vision adjustment range may be determined according to actual vision information of different users that actually view, or the like. Contents of light field sub-images matching with the content of the first region may be different or have local repetition. A region that affects displaying of each piece of light field sub-image information in the display is determined, and a collection of determined regions is the first display region of the embodiment of the present application. The first display region is generally a display region whose display pixel density is to be adjusted, for example, a display region whose display pixel density needs to be increased or a display region whose display pixel density needs to be reduced.

Figure 5A:
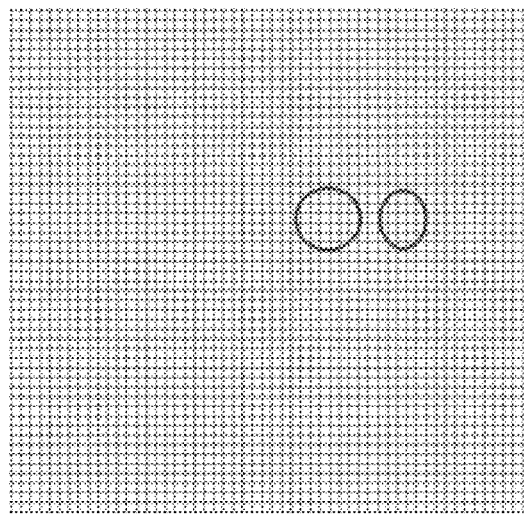
FIG. 5a is an example of display pixel density distribution of a display before adjustment according to an embodiment of the present application.
Figure 5B:
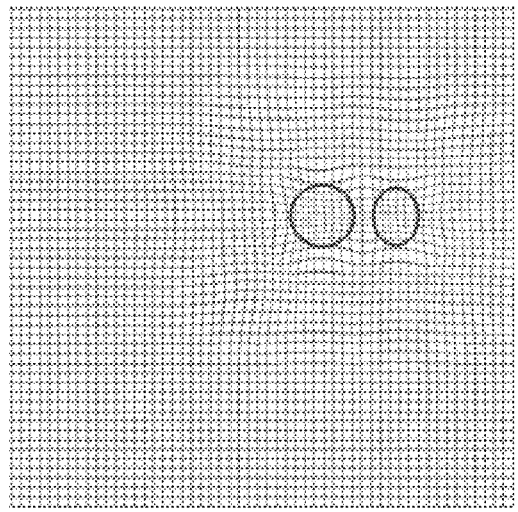
FIG. 5b is an example of display pixel density distribution of a display after adjustment according to an embodiment of the present application.
Figure 5C:
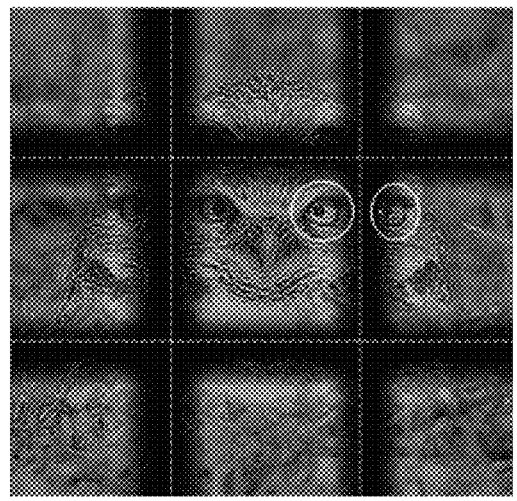
FIG. 5c is an example of a deformed light field image viewed by a user directly from a display before adjustment according to an embodiment of the present application.
Figure 5D:
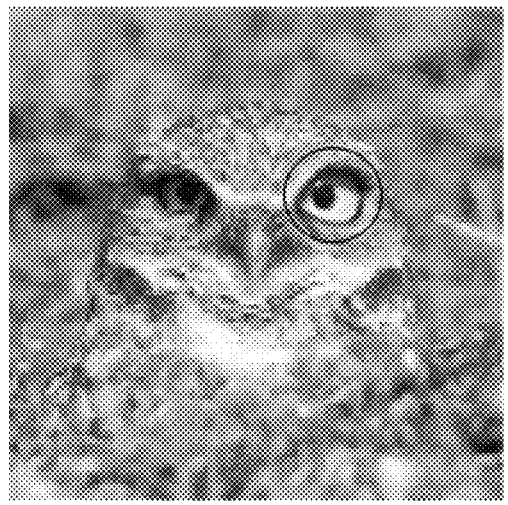
FIG. 5d is an example of a deformed light field image viewed by a naked eye of a user through a light field display device before adjustment according to an embodiment of the present application.
Figure 5E:
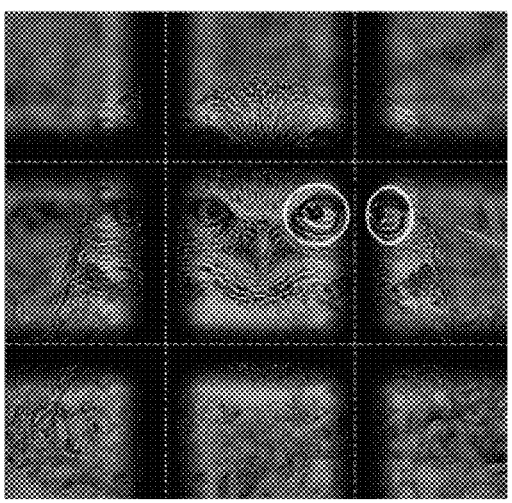
FIG. 5e is an example of a deformed light field image viewed by a user directly from a display after adjustment according to an embodiment of the present application.
Figure 5F:
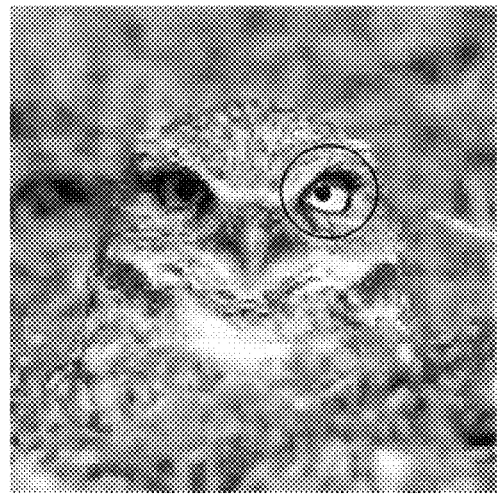
FIG. 5f is an example of a light field image viewed by a naked eye of a user through a light field display device after adjustment according to an embodiment of the present application.

A situation that local contents of light field sub-images displayed by a part of adjacent display regions are overlapped may be used as an example for description. The display pixel density distribution of the display of the light field display device before the adjustment is uniform, as shown in FIG. 5a. A light field image displayed by the display and viewed directly without using the lenslet array is generally a blurred image, and local contents of the light field sub-images displayed by a part of adjacent display regions are overlapped, as shown in FIG. 5c. The display pixel density distribution of the display is adjusted, and display pixels of the display after the adjustment are distributed non-uniformly, as shown in FIG. 5b, wherein the display pixel density of a part of display region is large, and the display pixel density of a part of display region is small. The light field image is displayed by the display after the adjustment, and an image viewed by the user by using the lenslet array may have some deformation, for example, a part of content of the image displayed by the region having the correspondingly large display pixel density has magnifying deformation, and the like, as shown in FIG. 5d. In order that display proportions of different parts of the image actually viewed by the user and the source image are the same as much as possible, sampling processing may be performed on the light field image according to actually positions of the display pixels of the display after the adjustment, and the light field image undergone the sampling processing is a deformed image relative to FIG. 5b when being viewed directly from the display without using the lenslet array, as shown in FIG. 5e. Because of the sampling processing, the light field image shown in FIG. 5e displayed by the display after the adjustment and viewed by the user by using the lenslet array is an image in which deformation is corrected, as shown in FIG. 5f, and the content of the image corresponding to a region having a large display pixel density of the display is relatively clear, so as to assume differentiated distribution of different partial clearness.

For another example, the first display region may be determined according to multiple pieces of vision information in the target vision adjustment range and relative location information of pixels in the first region relative to a reference point of the source image.

Figure 6:
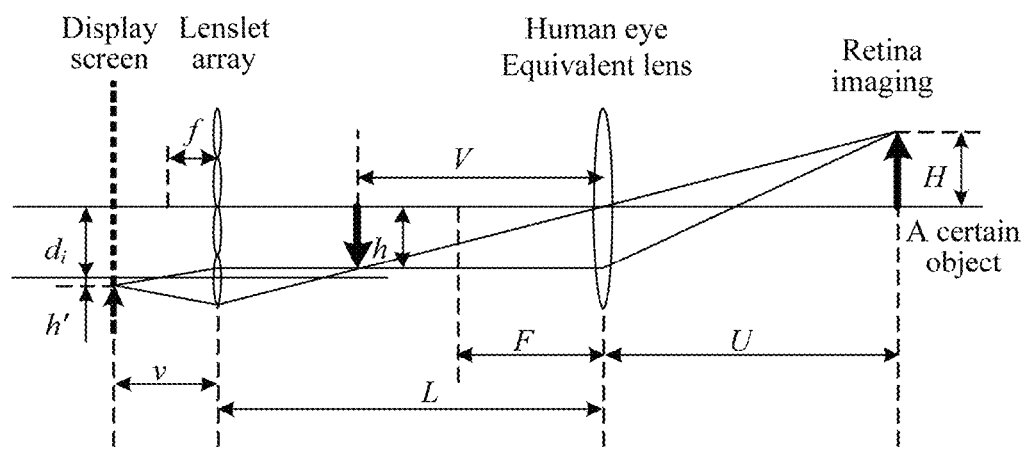
FIG. 6 is a third example of an optional optical path displayed by a light field according to an embodiment of the present application.

The reference point of the source image may be selected flexibly according to an actual requirement, for example, it may be, but not limited to, a centre of the source image, and the centre may be, but not limited to, corresponding to a centre of eyes of a viewer, and the like. When a user having certain vision information views a light field image displayed by the display by using the lenslet array, an image is formed at a retina of the user, and the image is proportionally corresponding to the source image (an original to-be-displayed image) corresponding to the light field image, and therefore, a correspondence between the source image and the display region of the display may be deduced according to imaging information of the retina corresponding to the certain vision information, referring to FIG. 6:

The following equations may be obtained according to an imaging formula and trigonometry relations:

$$\frac{1}{U} + \frac{1}{V} = \frac{1}{F} \tag{9}$$

$$\frac{1}{v} + \frac{1}{L-V} = \frac{1}{f} \tag{10}$$

$$\frac{H}{h} = \frac{U}{V} \tag{11}$$

$$\frac{d_i - h}{h'} = \frac{L-V}{v} \tag{12}$$

wherein, U, h and F are unknown, and others are known; U, V and L are respectively distances from the pupil of the eye (an eyeball lens) to the retina, to a display image, and to the lenslet array, F and f are respectively focal lengths of the pupil of the eye and the lenslet, v is a distance from the lenslet array to the pixel of the display, H, h and h' are respectively image sizes of a certain object on the retina, on a virtual image plane, and on an imaging region corresponding to the ith lenslet, and $d_i$ is a distance from the ith lenslet to a reference point, and the reference point may be any point of the source image. Here, an intersection of an optical axis of the eyeball lens and the display is used as an example to simplify the calculation, and the following equation may be obtained according to equations (9) to (12):

$$h' = \frac{(d_i U - LH)(v-f)}{fU} + \frac{Hv}{U} \tag{13}$$

Therefore, for any point imaged on the retina (it is assumed that a distance from the point to the optical centre of the eyeball lens is H, the point is equivalent to a certain pixel point corresponding to the source image, and H is equivalent to relative location information of the corresponding pixel point relative to the source image and a reference point corresponding to the optical centre of the eyeball lens), h' thereof on an imaging region corresponding to the ith lenslet can be calculated, that is, an imaging point position on the imaging region corresponding to the ith lenslet can be obtained by mapping. The first region of the source image is corresponding to multiple points of an image region of retina imaging, and h' on the imaging region respectively corresponding to multiple points (corresponding to the multiple points in the first region of the source image) may be obtained through calculation according to the above method, and according to each h' obtained through the calculation, it may be determined that a certain display region of the display is a display region that affects displaying of the light field image information corresponding to the first region of the source image. In the actual application, several specific pieces of vision information may be selected from the target vision adjustment range according to a predetermined rule, or multiple pieces of matching vision information selected from the target vision adjustment range may be determined according to actual vision information of different users that actually view. Different vision information is equivalent to having different U. For each piece of specific determined vision information, the manner of the above equation (13) may be used to calculate the display regions displayed by the display in the corresponding vision information and by the light field sub-image corresponding to the first region. A collection of display regions determined for multiple pieces of vision information is obtained, the obtained collection is the first display region of the embodiment of the present application, and the first display region is generally a display region whose display pixel density is to be adjusted, for example, a display region whose display pixel density needs to be increased or a display region whose display pixel density needs to be reduced. By using the solution, the region that affects displaying of the light field sub-image corresponding to the first region may be determined, and the implementation solution is simple.

The acquisition manner of the first region of the source image may be determined according to actual requirements, and is very flexible.

In an optional implementation manner, the first region of the source image may be determined according to Region of Interest (ROI) information, that is, region of interest information is acquired; and the first region of the source image is determined according to the region of interest information. The region of interest may comprise, but not limited to, one or more of the following: at least one region of the source image selected by the user (that is, a user selected region of the source image), at least one region of the source image fixed by the user (that is, a user fixation region of the source image), and a region of interest obtained by automatic detection on the source image by the image display control apparatus. The solution determines the first region of the source image according to the region of interest, and the determined first region may be a region corresponding to the region of interest, or the determined first region may be a region in the source image and corresponding to a region of non-interest, to cause that the determination of the first region is more coincide with the actual user requirement, thereby better meeting the personalized application requirement of the user.

In another optional implementation manner, the first region of the source image may be determined according to a result of image analysis, that is: perform image analysis on the source image; and determine the first region of the source image according to an analysis result on the source image. For example, human face recognition is performed on the to-be-displayed image, and a human face region is determined as the first region of the source image according to a recognition result. For another example, moving object recognition is performed on the to-be-displayed image, and a region corresponding to the moving object is determined as the first region of the source image according to a recognition result. The solution can determine the first region according to the image analysis result of the to-be-displayed image, to cause that the determination of the first region is more intelligent, thereby improving the efficiency and universality of determining the first region.

Further, the first region may comprise one or more first sub-regions. The first sub-region comprises at least a part of region in the source image whose display clearness needs to be enhanced relative to comparative display clearness. In a case that the first region comprises multiple first sub-regions, the distribution of the multiple first sub-regions in the source image may be successive, for example, the multiple first sub-regions have connection boundaries; or, the distribution of the multiple first sub-regions in the source image may be discrete, for example, boundaries of the multiple first sub-regions are not connected, or the boundary of at least one of the first sub-regions in the multiple first sub-regions is not connected to boundaries of other first sub-regions. The display clearness of the first sub-region may be adjusted to be increased or reduced relative to the comparison display clearness, which is not limited in the embodiment of the present application. The solution improves the flexibility of determining the first region in the source image that needs to adjust the image display clearness, so as to better meet diversified application requirements of users.

Moreover, in the case that the first region comprises multiple first sub-regions, the target pixel density of corresponding display region that affects displaying of the light field sub-image respectively corresponding to each first sub-region may be determined according to an actual requirement. The target pixel density distributions of different display regions that correspondingly affect displaying of light field sub-images respectively corresponding to different first sub-regions may be the same or different, which may be determined according to an actual requirement, and an implementation manner is very flexible. For example, the first region comprises a first sub-region A and a second sub-region B, respectively corresponding to light field sub-image information A' and a light field sub-image B', a display region that affects displaying of the light field sub-image information A' in the display is a display region A'', and a display region that affects displaying of the light field sub-image information B' in the display is a display region B''. In this case, in the determined target pixel density distribution information, the target pixel density corresponding to the display region A'' and the target pixel density corresponding to the display region B' may be the same, and therefore, display clearness of the multiple first sub-regions in the source image may be adjusted to the same extent, to case that display clearness of content corresponding to various first sub-regions in the displayed light field image are the same or as close as possible. Or, in the determined target pixel density distribution information, the target pixel density corresponding to the display region A'' and the target pixel density corresponding to the display region B'' may be different, for example, although the target pixel densities all need to be increased relative to an original pixel density, they have different increment amplitudes, and therefore, display clearness of the multiple first sub-regions in the source image may be adjusted to different extents, to cause that the display clearness of content corresponding to various first sub-regions in the displayed light field image are also differentiated in a certain extent.

In the embodiment of the present application, after the target pixel density distribution information is acquired, the pixel density distribution of the display may be adjusted according to the target pixel density distribution information. The adjustment manner on the pixel density distribution of the display may be selected according to actual requirements, which is not limited in the embodiment of the present application. In an optional implementation manner, deformation control information of a controllable deformation material part may be determined according to the target pixel density distribution information; and the controllable deformation material part is controlled according to the deformation control information to be deformed, so as to correspondingly adjust the display pixel density distribution of the display through the deformation of the controllable deformation material part. The solution adjusts the pixel distribution of the display by controlling the deformation of the controllable deformation material part, and the solution is simple and is easy to implement.

Figure 1B:
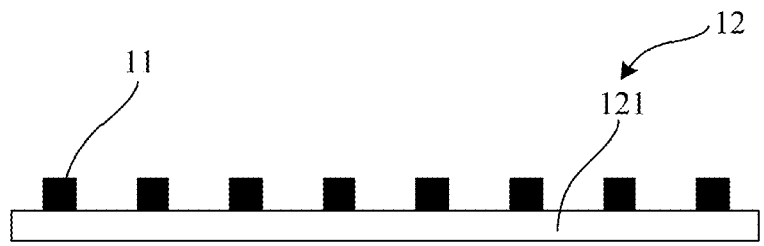
FIG. 1b is a schematic structural diagram of a first pixel density adjustable display according to an embodiment of the present application.

FIG. 1b is a schematic structural diagram of a pixel density adjustable display according to an embodiment of the present application. As shown in FIG. 1b, the pixel density adjustable display according to the embodiment of the present application comprises: multiple display pixels 11 and a controllable deformation material part 12. The display performs image display by using the display pixels 11, the multiple display pixels 11 are distributed in an array, and the controllable deformation material part 12 is respectively connected to the multiple display pixels 11. The controllable deformation material part 12 may deform under the action of an external field, ad density distribution of the multiple display pixels 11 is adjusted correspondingly through the deformation of the controllable deformation material part 12. The controllable deformation material part can be deformed by changing a certain external function factor (for example, an external field) applied thereon, and when the external field applied thereon is removed or changed, the deformation of the controllable deformation material part can be restored. The display pixel may comprise, but not limited to, at least one light emitting unit. The light emitting unit may comprise, but not limited to an LED light emitting unit and an OLED light emitting unit. A light emitting color of the light emitting unit may be determined according to an actual requirement, and the light emitting unit may comprise, but not limited to, one or more light emitting sub-units; the light emitting sub-unit may comprise an LED light emitting sub-unit and an OLED light emitting sub-unit. The multiple light emitting sub-units may comprise, but not limited to, LED light emitting sub-units and OLED light emitting sub-units having different colors such as red (R), green (G) and blue (B).

In the multiple display pixels distributed in an array and comprised in the display according to the embodiment of the present application, each display pixel and the controllable deformation material part may be closely connected by using, but not limited to, a manner such as adhering. In this way, when the controllable deformation material part is deformed, pitches between the display pixels are adjusted correspondingly, thereby changing the density distribution of the display pixels, and achieving the effect of differentiating the display pixel density distribution for different regions of the display according to an actual requirement.

In a process of actually applying the technical solution provided in the embodiment of the present application, the external field non-uniformly distributed may be applied to different regions of the controllable deformation material part, to case that the different partial regions of the controllable deformation material part have deformations of different extents, thereby adjusting the overall density distribution of the display pixels. Optionally, the external field may be applied to regions of the controllable deformation material part that are not overlapped with multiple display pixels, to cause that the regions of the controllable deformation material pat overlapping with the display pixels are not deformed, but the density distribution of the display pixels are changed by deformation of other parts of the controllable deformation material part. The solution is conducive to prevent the deformation of the controllable deformation material part from damaging the display pixels.

Further, the controllable deformation material part may be prepared by selecting at least one suitable controllable deformation material as desired, to cause that the controllable deformation material part has properties of deformable and restorable deformation. The optional controllable deformation material part is at least made of one or more of the following controllable deformation materials: a piezoelectric material, an electroactive polymer, a photoinduced deformation material, and a magnetostrictive material.

The piezoelectric material may have mechanical deformation under the action of an electric field. The controllable deformation material part prepared by using the piezoelectric material is referred to as a piezoelectric material part. By using this physical property of the piezoelectric material, the embodiment of the present application may, but not limited to, determine, according to the target pixel density distribution information, electric field control information required by enabling the piezoelectric material part to have corresponding mechanical deformation, the electric field applied to the piezoelectric material part is controlled according to the electric field control information, to cause that the piezoelectric material part has corresponding mechanical deformation. The pixel density distribution of the display is adjusted correspondingly through the mechanical deformation of the piezoelectric material part, thereby achieving the objective of adjusting the display pixel density distribution of the display according to the target pixel density distribution information. The piezoelectric material may comprise, but is not limited to, one of the following, piezoelectric ceramic, and a piezoelectric crystal. The solution can adjust the pixel density distribution of the display by fully using the physical property of the piezoelectric material.

The electroactive polymers (EAP) are a type of polymer materials that can change their shape or size under the action of an electric field. The controllable deformation material part prepared by using the electroactive polymers is referred to as an electroactive polymer part. By using this physical property of the electroactive polymer, the embodiment of the present application may, but not limited to, determine, according to the target pixel density distribution information, electric field control information required by enabling the electroactive polymer part to have corresponding mechanical deformation, the electric field applied to the electroactive polymer part is controlled according to the electric field control information, to cause that the electroactive polymer part has corresponding mechanical deformation. The pixel density distribution of the display is adjusted correspondingly through the deformation of the electroactive polymer part, thereby achieving the objective of adjusting the display pixel density distribution of the display according to the target pixel density distribution information. The electroactive polymers may comprise, but are not limited to, at least one of the following: electron-type electroactive polymers and ion-type electroactive polymers. The electron-type electroactive polymers may comprise at least one of the following: ferroelectric polymers (such as polyvinylidene fluoride), electrostrictive grafted elastomers, and liquid crystalline elastomers. The ion-type electroactive polymers comprise at least one of the following: the electrorheological fluid, Ionic polymer-metal composite, and the like. The solution can adjust the pixel density distribution of the display by fully using the physical property of the electroactive polymers.

The photoinduced deformation material is a type of polymer material that can change the shape or size thereof under the action of a light field. The controllable deformation material part prepared by using the photoinduced deformation material is referred to as a photoinduced deformation material part. By using such a physical property of the photoinduced deformation material, the embodiment of the present application can, but not limited to, determine, according to the target pixel density distribution information, light field control information required by corresponding deformation of the photoinduced deformation material part, and the light field applied to the photoinduced deformation material part is controlled according to the light field control information, to cause that the photoinduced deformation material part to deform correspondingly. The pixel density distribution of the display is adjusted correspondingly through the deformation of the photoinduced deformation material part, thereby achieving the objective of adjusting the display pixel density distribution of the display according to the target pixel density distribution information. The photoinduced deformation material may comprise, but not limited to, at least one of the following: photostrictive ferroelectric ceramics and photoinduced deformation polymers. The photostrictive ferroelectric ceramics comprise, but not limited to, lead lanthanum zirconatetitanate (PLZT) ceramics, and the photoinduced deformation polymers comprise, but not limited to, photoinduced deformation liquid crystalline elastomers. The solution can adjust the pixel density distribution of the display by fully using the physical property of the photoinduced deformation material.

The magnetostrictive material is a type of magnetic material that can change the magnetization state thereof under the action of a magnetic field thereby changing the size thereof. The controllable deformation material part prepared by using the magnetostrictive material is referred to as a magnetostrictive material part. By using such a physical property of the magnetostrictive material, the embodiment of the present application can, but not limited to, determine, according to the target pixel density distribution information, magnetic field control information required by corresponding deformation of the magnetostrictive material, and the magnetic field applied to the magnetostrictive material part is controlled according to the magnetic field control information, to cause that the magnetostrictive material part to deform correspondingly. The pixel density distribution of the display is adjusted correspondingly through the deformation of the magnetostrictive material part, thereby achieving the objective of adjusting the display pixel density distribution of the display according to the target pixel density distribution information. The magnetostrictive material may comprise, but not limited to, rare-earth giant magnetostrictive material, such as an alloy material $Tbo_{0.3}Dy_{0.7}Fe_{1.95}$ using $(Tb,Dy)Fe_2$ compound as a substrate. The solution can adjust the pixel density distribution of the display by fully using the physical property of the magnetostrictive material.

In the technical solution provided in the embodiment of the present application, specific structures and connection manners of the display pixels and the controllable deformation material part can be determined according to actual requirements, and an actual manner is very flexible.

In an optional implementation manner, as shown in FIG. 1b, the controllable deformation material part 12 comprises: a controllable deformation material layer 121, and the multiple display pixels 11 are distributed in an array and connected to one surface of the controllable deformation material layer 121. Optionally, it may be selected according to an actual process condition to directly form the multiple display pixels on the controllable deformation material layer 121, or the multiple display pixels and the controllable deformation material layer 121 may be prepared respectively, and the two may be closely connected by using, but not limited to, adhering. The solution is simple in structure and easy to implement.

Figure 1C:
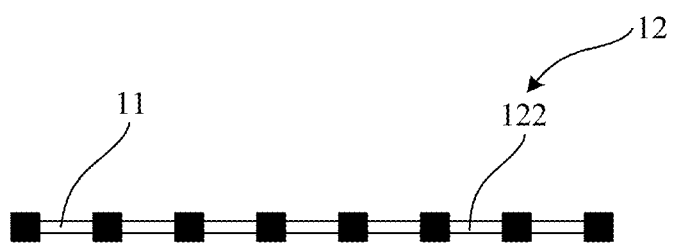
FIG. 1c is a schematic structural diagram of a second pixel density adjustable display according to an embodiment of the present application.

In another optional implementation manner, as shown in FIG. 1c, the controllable deformation material part 12 comprises multiple controllable deformation material connecting sub-parts 122, the controllable deformation material connecting sub-parts 122 are distributed in an array to correspondingly connect the multiple display pixels 11 distributed in an array, that is, the multiple display pixels distributed in an array are connected into one piece by using the multiple controllable deformation material connecting sub-parts distributed in an array. Optionally, the multiple controllable deformation material connecting sub-parts may be formed at interval regions of pixels of the display pixel array according to an actual process, and the multiple controllable deformation material connecting sub-parts and the corresponding display pixels may be connected by using, but not limited to, abutting, adhering, and the like. The density distribution of the display pixels may be adjusted by controlling the deformation of the multiple controllable deformation material connecting sub-parts, and the structure is simple and easy to implement.

Figure 1D:
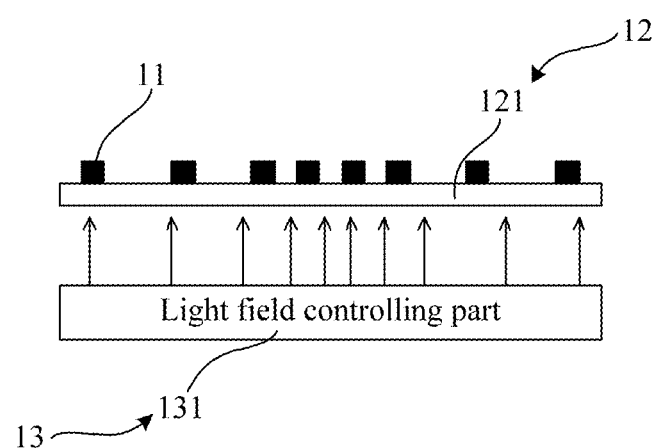
FIG. 1d is a schematic structural diagram of a third pixel density adjustable display according to an embodiment of the present application.
Figure 1E:
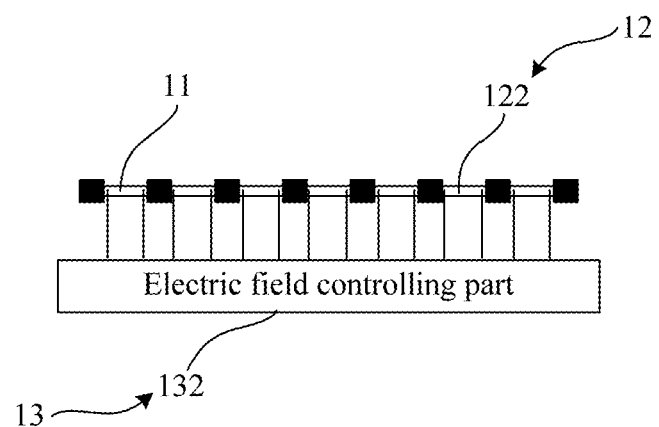
FIG. 1e is a schematic structural diagram of a fourth pixel density adjustable display according to an embodiment of the present application.

Further, as shown in FIG. 1d and FIG. 1e, the display may further comprise: a deformation controlling part 13, and the deformation controlling part 13 is configured to adjust distribution of the external field that is applied to the controllable deformation material part 12, so as to control the controllable deformation material part 12 to deform. In this way, when the controllable deformation material part 12 deforms, pitches between the display pixels 11 are adjusted correspondingly, thereby changing the density distribution of the display pixels 11, and achieving the effect of differentiating the display pixel density distribution for different regions of the display according to actual requirements.

Optionally, as shown in FIG. 1d, the deformation controlling part may comprise a light field controlling part 131, and the light field controlling part 131 is configured to adjust distribution of an external light field that is applied to the controllable deformation material part 12, so as to control the controllable deformation material part 12 to deform correspondingly. In this case, the controllable deformation material part 12 may comprise a photoinduced deformation material part prepared at least by using a photoinduced deformation material, for example, the photoinduced deformation material part may comprise a photoinduced deformation material layer prepared at least by using the photoinduced deformation material, or the photoinduced deformation material part may comprise multiple photoinduced deformation material connecting sub-parts prepared at least by using the photoinduced deformation material. The light field controlling part 131 changes the light field distribution applied to the photoinduced deformation material part (different densities of arrows in FIG. 1d represent a light field of the controllable deformation material part 12 distributed in different intensities), so as to excite different regions of the controllable deformation material part 12 to deform to different extents; moreover, the pitches between the display pixels 11 are correspondingly changed through the deformation of the controllable deformation material part 12, thereby changing the density distribution of the display pixels 11, and achieving the effect of differentiating the display pixel density distribution for different regions of the display according to actual requirements.

Figure 1F:
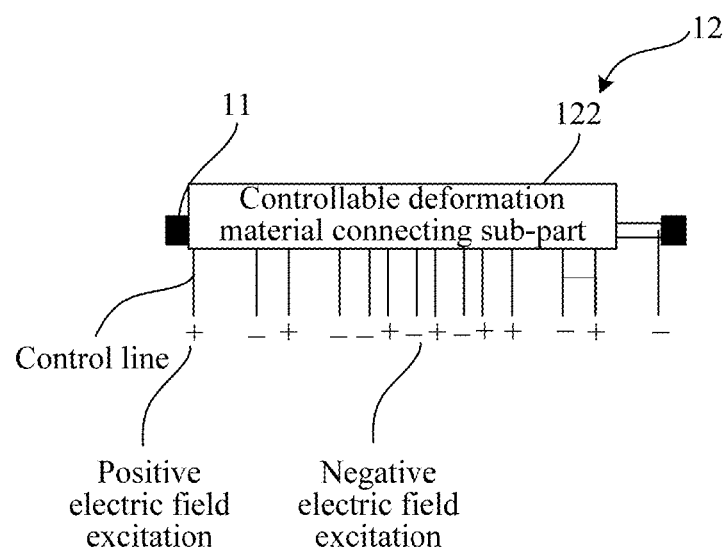
FIG. 1f is an example of a scenario of performing pixel density adjustment by a display in a case of non-uniform light field excitation according to an embodiment of the present application.

Optionally, as shown in FIG. 1e, the deformation controlling part may comprise an electric field controlling part 132, and the electric field controlling part 132 is configured to adjust distribution of an external electric field that is applied to the controllable deformation material part, so as to control the controllable deformation material part to deform correspondingly. In this case, the controllable deformation material part 12 may comprise a piezoelectric material part (such as a piezoelectric material layer or a piezoelectric material connecting sub-part) at least prepared by the piezoelectric material, or, the controllable deformation material part 12 may comprise an electroactive polymer part (such as an electroactive polymer layer or an electroactive polymer connecting sub-part) at least prepared by the electroactive polymers. As shown in FIG. 1e, the electric field control part and the controllable deformation material may be connected by using a control line, and the electric field control part 132 changes the electric field distribution applied to the controllable deformation material part, so as to excite different regions of the controllable deformation material part 12 to deform to different extents. If the electric field applied to the controllable deformation material part 12 is a zero electric field, the controllable deformation material part does not deform (which is referred to as zero electric field excitation); if the intensity distribution of the electric field applied to the controllable deformation material part 12 is changed ("+" positive electric field excitation and "−" negative electric field excitation as shown in the drawing), the electric field intensities applied to different regions of the controllable deformation material part have a difference, as shown in FIG. 1f, and in this way, different regions of the controllable deformation material part may deform to different extents, and pitches between the display pixels 11 are adjusted correspondingly through the deformation of the controllable deformation material part 12, thereby changing the overall pixel density distribution of the display, and achieving the effect of differentiating the display pixel density distribution for different regions of the display according to actual requirements.

In the embodiment of the present application, the controllable deformation part and the deformation controlling part may be connected directly or indirectly. The deformation controlling part may be used as a part of the display, or the deformation controlling part may not be used as a part of the display, and the display may be connected to the deformation controlling part by using a manner such as a reserved pin and an interface. The external field applied to the controllable deformation material part may comprise, but not limited to, an electric field, a magnetic field, a light field, and the like. Hardware and software structures that are used to generate the electric field, hardware and software structures that are used to generate the magnetic field, and hardware and software structures that are used to generate the light field may be implemented by using corresponding prior arts according to actual requirements, which are not repeated in the embodiment of the present application.

Figure 1G:
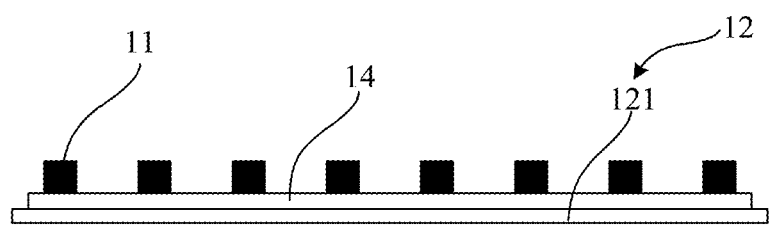
FIG. 1g is a schematic structural diagram of a fifth pixel density adjustable display according to an embodiment of the present application.
Figure 1H:
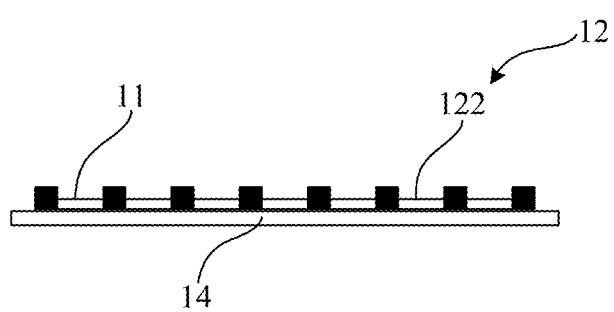
FIG. 1h is a schematic structural diagram of a sixth pixel density adjustable display according to an embodiment of the present application.

Optionally, the display may further comprise a flexible substrate, and the flexible substrate may comprise, but not limited to, a flexible plastic substrate, which has certain flexibility, and the shape of the flexible substrate may be changed as desired. The display pixels and the controllable deformation material part may be disposed at the same side or different sides of the flexible substrate. For example, as shown in FIG. 1g, the multiple display pixels 11 are connected to one surface of a flexible substrate 14, and the controllable deformation material part (for example, the controllable deformation material layer 121) is connected to the other surface of the flexible substrate 14. For another example, as shown in FIG. 1h, the multiple display pixels 11 are connected to one surface of a flexible substrate 14, and the controllable deformation material part (for example, the controllable deformation material connecting sub-part 122) is connected to the corresponding display pixels and is located at the surface of the flexible substrate 14 the same as the display pixels 11. The solution can not only control the controllable deformation material part to deform by using the external field applied thereto, so as to indirectly adjust the overall pixel density distribution of the display, thereby implementing the adjustable pixel density of the display, and can also change the shape of the display because of the use of the flexible substrate, so as obtain a curved display by bending the planar display by a certain angle, thereby meeting diversified application requirements of image display, decoration and the like.

Figure 1I:
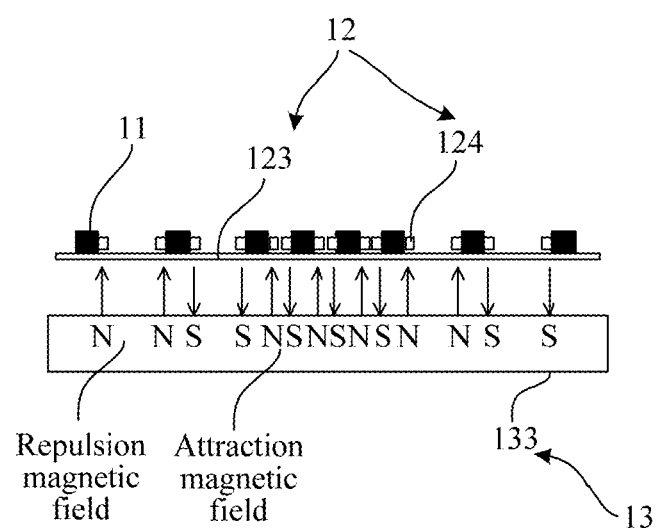
FIG. 1i is a schematic structural diagram of a seventh pixel density adjustable display according to an embodiment of the present application.

FIG. 1i is a schematic structural diagram of a seventh pixel density adjustable display according to an embodiment of the present application. In the display shown in FIG. 1i, the controllable deformation material part 12 comprises: a flexible substrate 123 and multiple magnetic conductive material parts 124. The multiple display pixels 11 are respectively connected to the flexible substrate 123, and at least a part of the display pixels 11 are connected to multiple magnetic conductive material parts 124. By changing a magnetic field applied to the magnetic conductive material part 124, the flexible substrate 123 is deformed correspondingly, and the density distribution of the multiple display pixels 11 are adjusted correspondingly through the deformation. For example, a magnetic conductive material part 124 may be set on one side surface of each display pixel. Optionally, the display pixels 11 are respectively adhered to the flexible substrate 123 and the magnetic conductive material part 124. The magnetic conductive material part may comprise a magnetic pole prepared by using the magnetic conductive material, and the magnetic conductive material may use, but not limited to, one or more of a soft magnetic material, a silicon steel sheet, a permalloy, a ferrite, an amorphous soft magnetic alloy, a super-microcrystalline soft magnetic alloy, and the like. The magnetic conductive material part prepared by using the soft magnetic material has a desirable magnetic conduction performance, and the residual magnetism after the magnetic field is removed is very small to be conducive to the next adjustment.

Further, optionally, the deformation controlling part 13 of the embodiment of the present application may further comprise a magnetic field controlling part 133, and the magnetic field controlling part 133 is configured to adjust distribution of an external magnetic electric field that is applied to the controllable deformation material part, so as to control the controllable deformation material part to deform correspondingly. For example, when the magnetic field controlling part 133 controls the magnetic field (that is, an excitation magnetic field) applied to the magnetic conductive material part 124 to change, as shown in FIG. 1i, an identical magnetic poles (NN or SS) repulsion magnetic field or a different magnetic poles (NS or SN) attraction magnetic field having a certain magnetic field intensity distribution is applied between the adjacent display pixels, a repulsion force or attraction force may be generated between the magnetic poles, and the magnetic force is transmitted to the flexible substrate 123 to cause the flexible substrate 123 to deform, such as stretch, thereby causing the pitches between the corresponding display pixels to be changed, and implementing the objective of adjusting the display pixel density distribution. The solution implements adjustable pixel density distribution on the display in combination with the deformation property such as stretchable of the flexible substrate and the magnetic field control principle.

Figure 1J:
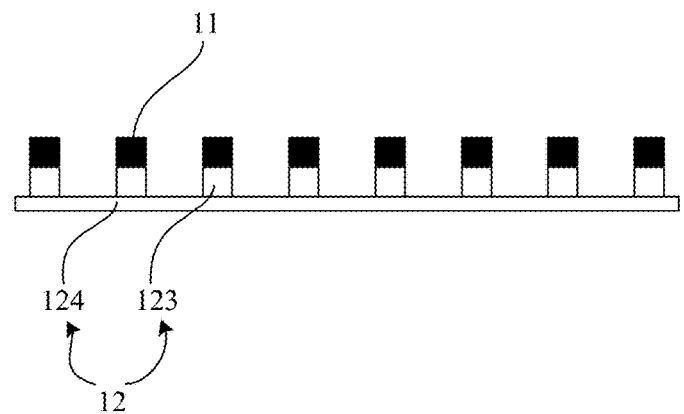
FIG. 1j is a schematic structural diagram of an eighth pixel density adjustable display according to an embodiment of the present application.

FIG. 1j is a schematic structural diagram of an eighth pixel density adjustable display according to an embodiment of the present application. In the display shown in FIG. 1j, the controllable deformation material part 12 comprises; a flexible substrate 123 and multiple magnetic conductive material parts 124. One side of each of the magnetic conductive material parts 124 is connected to the flexible substrate 123, and the opposite side of the magnetic conductive material part 124 is correspondingly connected to multiple display pixels 11, and by changing the magnetic field applied to the magnetic conductive material part 124, the flexible substrate 123 is deformed correspondingly, and the density distribution of the multiple display pixels 11 is adjusted correspondingly through the deformation. Optionally, the magnetic conductive material part 124 is adhered to the flexible substrate 123, the display pixels 11 are adhered to the magnetic conductive material part 124, and when the magnetic field applied to the magnetic conductive material part 124 is changed, the magnetic force is transmitted to the flexible substrate 123 to cause the flexible substrate 123 to be deformed, such as stretched, thereby implementing the objective of adjusting the display pixel density distribution. The solution implements adjustable pixel density distribution on the display in combination with the deformation property such as stretchable of the flexible substrate and the magnetic field control principle.

The technical solution provided in the embodiment of the present application may implement adjustable pixel density of the display, and implement image display based on the pixel density adjustable display, so as to fully use the overall pixels of the display to present display clearness of different regions of an image in a differentiated manner, thereby improving the actual utilization of the display pixels, and being conducive to satisfying diversified application requirements of users. The pixel density adjustable display may be applicable to a device having an image display function, for example, may be applicable to, but not limited to, the following devices: a television, a computer, a camera, a mobile phone, a video camera, and the like.

A person skilled in the art should understand that in any of the above methods of the specific implementation manner of the present application, serial numbers of steps do not indicate priorities of execution sequences, the execution sequences of the steps should be determined according to functions and inner logic thereof, and should not constitute a limitation to implementation processes of the specific implementation manner of the present application.

Optionally, the light field display control method further comprises: performing a balanced control on display brightness of different display regions of the display in a process that the light field display device after the adjustment displays the light field image undergone the sampling processing. The display pixel density distribution of the display of the light field display device is adjusted, the distribution of the display pixels of the display after the adjustment is non-uniform, and a part of display pixels have a large density and a part of display pixels have a small density, the brightness of the image content part presented to the user by the display region having the large display pixel density by using the corresponding lenslet may be large, and the brightness of the image content part presented to the user by the display region having the small display pixel density by using the corresponding lenslet may be small, which causes that the overall brightness distribution of the light field image may be unbalanced. If the display effect of unbalanced brightness distribution is a display effect wanted by the user, or the user does not care about the display effect of unbalanced brightness distribution, or the like, the balanced control on the brightness may not be performed. Otherwise, in a process that the light field display device after the adjustment displays the light field image undergone the sampling processing, balanced control is performed on display brightness of different display regions of the display. For example, the brightness of the display region having the large display pixel density is appropriately reduced, and/or the brightness of the display region having the small display pixel density is appropriately increased, so as to reduce the brightness difference of different parts of the actually displayed light field image, thereby improving the viewing effect and the user experience.

A person skilled in the art should understand that in any of the above methods of the specific implementation manner of the present application, serial numbers of steps do not indicate priorities of execution sequences, the execution sequences of the steps should be determined according to functions and inner logic thereof, and should not constitute a limitation to implementation processes of the specific implementation manner of the present application.

Figure 7:
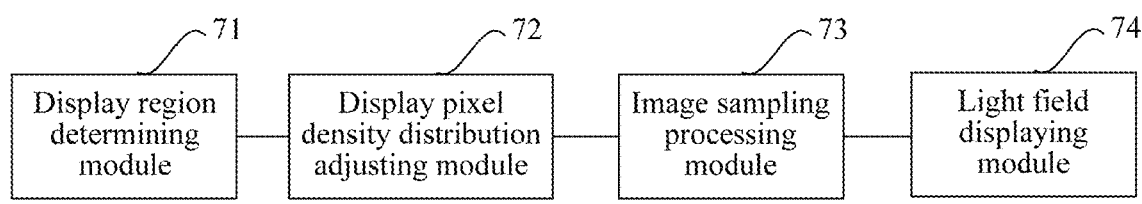
FIG. 7 is a logic block diagram of a first light field display control apparatus according to an embodiment of the present application.

FIG. 7 is a logic block diagram of a first light field display control apparatus according to an embodiment of the present application. As shown in FIG. 7, the light field display control apparatus provided in the embodiment of the present application may comprise: a display region determining module 71, a display pixel density distribution adjusting module 72, an image sampling processing module 73, and a light field displaying module 74.

The display region determining module 71 is configured to determine a first display region of a display of a light field display device at least according to target vision adjustment range information.

The display pixel density distribution adjusting module 72 is configured to adjust display pixel density distribution of the display, to cause that display pixel density distribution of the first display region in the display after the adjustment is different from that of another display region of the display.

The image sampling processing module 73 is configured to perform sampling processing on a first light field image according to actual location information of display pixels of the display after the adjustment, the first light field image being corresponding to vision information in the target vision adjustment range and related to a source image.

The light field displaying module 74 is configured to display, by the light field display device after the adjustment, the first light field image undergone the sampling processing.

The technical solution provided in the embodiment of the present application determines the first display region of the display of the light field display device according to the target vision information adjustment range (equivalent to the target refocusing range), and adjusts contributions of light field image information display by different display regions of the display on the refocusing precision in the refocusing range by adjusting the display pixel density distribution of the display region of the display. For example, by improving the display pixel density of the first display region, the abundance of the light field image information displayed by the first display region is improved, thereby improving the refocusing precision of the refocusing range (the target vision adjustment range) corresponding to the first display region, to cause that there are more refocused focal points within the target vision adjustment range, thereby improving the precision of vision correction on viewing an image by naked eyes of users having different vision information in the target vision adjustment range.

The presentation form of the device of the light field display control apparatus is not limited, for example, the light field display control apparatus may be a certain independent component, and the component cooperatively communicates with a light field display device comprising a display; or the light field display control apparatus may be integrated in a display device comprising a display as a certain functional module, and the light field display device may comprise, but not limited to, a device having a light field display capability and comprising the display, such as a television, a computer, a camera, a mobile phone, and a video recorder.

Figure 8:
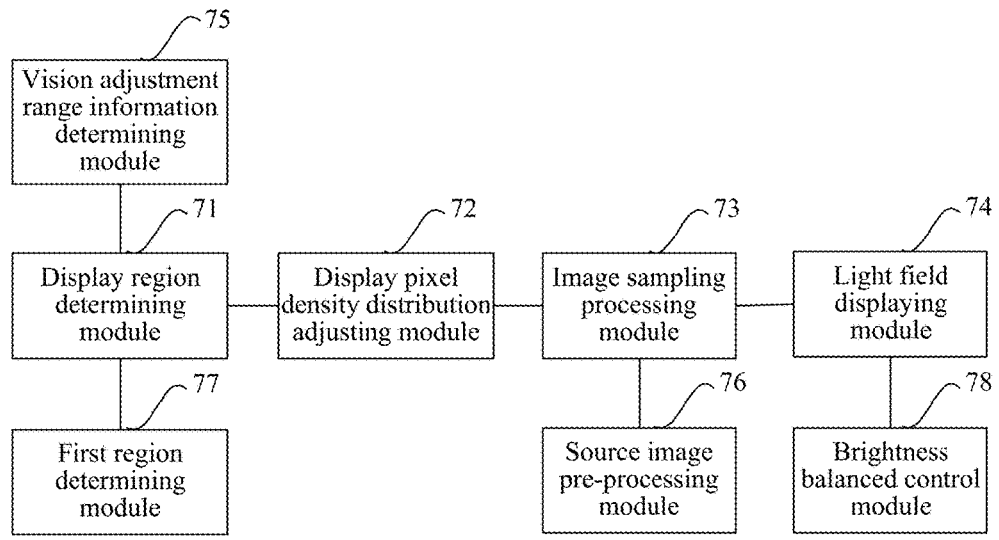
FIG. 8 is a logic block diagram of a second light field display control apparatus according to an embodiment of the present application.

Optionally, as shown in FIG. 8, the light field display control apparatus may further comprise: a vision adjustment range information determining module 75. The vision adjustment range information determining module 75 is configured to determine the target vision adjustment range according to vision information of a user. The solution may comprise the vision information of the user into the target vision adjustment range, to cause that when the user views the light field display image by using the display after the adjustment, a refocused image corresponding to the vision information thereof or having less correspondence error may be obtained, and the user views a clear or relatively clear image.

Optionally, the light field display control apparatus may further comprise: a source image pre-processing module 76. The source image pre-processing module 76 is configured to pre-process the source image according to the vision information of the user to obtain the first light field image. The solution can not only be applied to pre-processing scenario a light field image corresponding to the source image viewed by a user having normal relative vision, and can also be applied to pre-processing of a light field image corresponding to the source image viewed by a user having relative vision that needs to be corrected (such as far-sighted or short-sighted), and the implementation manner thereof is flexible.

Figure 9:
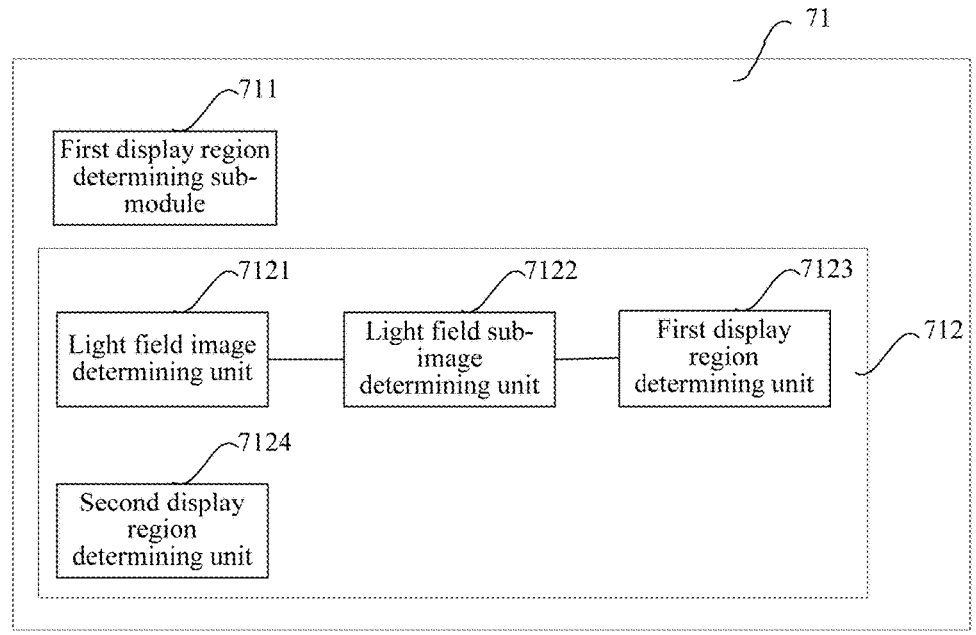
FIG. 9 is a logic block diagram of a display region determining module according to an embodiment of the present application.

Optionally, as shown in FIG. 9, the display region determining module 71 comprises: a first display region determining sub-module 711. The first display region determining sub-module 711 is configured to determine, according to the target vision adjustment range, a first display sub-region to be adjusted respectively in at least one display region of the display as the first display region. Optionally, a to-be-adjusted first display sub-region of the display region is an annular region having a certain radial width in the display region. Optionally, before and after the display density pixel adjustment is performed on the display region, the display pixels of the display region are keep unchanged, but the display pixel density distribution is changed.

Optionally, the display region determining module 71 comprises: a second display region determining sub-module 712. The second display region determining sub-module 712 is configured to determine the first display region according to the target vision adjustment range and a first region of the source image, and the first region being a part of the source image.

Optionally, the second display region determining sub-module 712 comprises: a light field image determining unit 7121, a light field sub-image determining unit 7122, and a first display region determining unit 7123. The light field image determining unit 7121 is configured to determine multiple second light field images according to the target vision adjustment range, the second light field image being corresponding to vision adjustment information in the target vision adjustment range and related to the source image; the light field sub-image determining unit 7122 is configured to determine light field sub-image information corresponding to the first region in the multiple second light field images; and the first display region determining unit 7123 is configured to determine a display region in the display that affects displaying of the light field sub-image information as the first display region.

Optionally, the second display region determining sub-module 712 comprises: a second display region determining unit 7124. The second display region determining unit 7124 is configured to determine the first display region according to multiple pieces of vision information in the target vision adjustment range and relative location information of pixels in the first region relative to a reference point of the source image.

Optionally, as shown in FIG. 8, the light field display control apparatus may further comprise: a first region determining module 77. The first region determining module 77 is configured to determine a first region of the source image.

Figure 10:
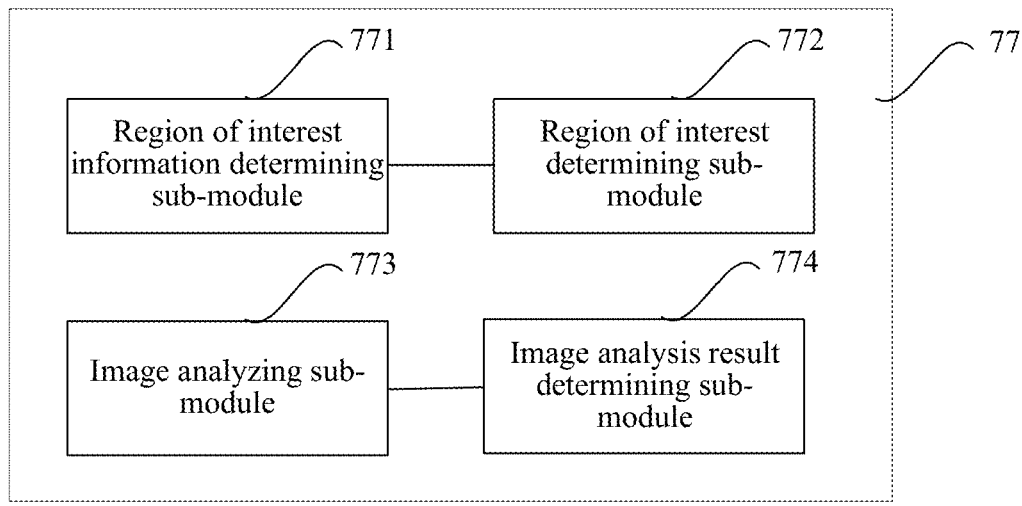
FIG. 10 is a logic block diagram of a first region determining module according to an embodiment of the present application.

Optionally, as shown in FIG. 10, the first region determining module 77 comprises: a region of interest information determining sub-module 771 and a region of interest determining sub-module 722. The region of interest information determining sub-module 771 is configured to acquire region of interest information; and the region of interest determining sub-module 722 is configured to determine the first region of the source image according to the region of interest information. The solution enables the determination of the first region to be more coincide with the actual user requirement, and can better meet a personalized application requirement of the user.

Optionally, the first region determining module 77 comprises: an image analyzing sub-module 773 and an image analysis result determining sub-module 774. The image analyzing sub-module 773 is configured to perform image analysis on the source image; and the image analysis result determining sub-module 774 is configured to determine the first region of the source image according to an analysis result of the source image. The solution enables the determination of the first region to be more intelligent, thereby improving the efficiency and universality of determining the first region.

Figure 11:
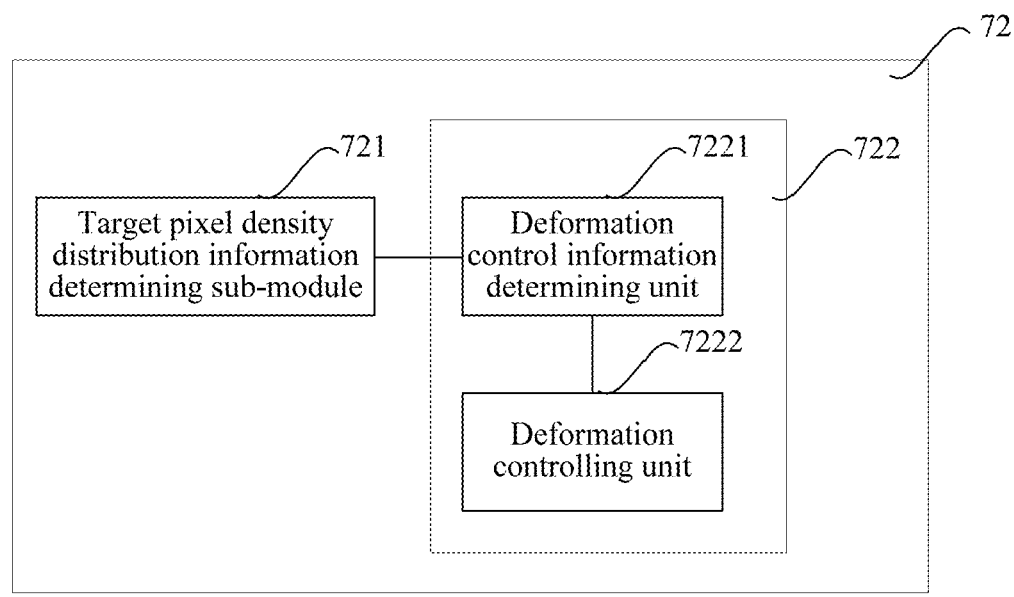
FIG. 11 is a logic block diagram of a display pixel density distribution adjusting module according to an embodiment of the present application.

Optionally, as shown in FIG. 11, the display pixel density distribution adjusting module 72 comprises: a target pixel density distribution information determining sub-module 721 and a display pixel density distribution adjusting sub-module 722. The target pixel density distribution information determining sub-module 721 is configured to determine target pixel density distribution information according to the first display region, wherein in the target pixel density distribution information, a target pixel density corresponding to the first display region is different from a target pixel density corresponding to another display region; and the display pixel density distribution adjusting sub-module 722 is configured to adjust the display pixel density distribution of the display according to the target pixel density distribution information.

Optionally, the display pixel density distribution adjusting sub-module 722 comprises: a deformation control information determining unit 7221 and a deformation controlling unit 7222. The deformation control information determining unit 7221 is configured to determine deformation control information of a controllable deformation material part according to the target pixel density distribution information; and the deformation controlling unit 7222 is configured to control, according to the deformation control information, the controllable deformation material part to deform, so as to adjust the display pixel density distribution of the display correspondingly through the deformation of the controllable deformation material part. The controllable deformation material part can be deformed by changing a certain external function factor (for example, an external field) applied thereon, and when the external field applied thereon is removed or changed, the deformation of the controllable deformation material part can be restored. The optional controllable deformation material part is at least made of one or more of the following controllable deformation materials: a piezoelectric material, an electroactive polymer, a photoinduced deformation material, and a magnetostrictive material. The solution adjusts the pixel distribution of the display by controlling the deformation of the controllable deformation material part, and the solution is simple and is easy to implement.

Optionally, as shown in FIG. 8, the light field display control apparatus may further comprise: a brightness balanced control module 78. The brightness balanced control module 78 is configured to perform a balanced control on display brightness of different display regions of the display in a process that the light field display device after the adjustment displays the light field image undergone the sampling processing. The solution can reduce the brightness difference of different parts of the actually displayed light field image, thereby improving the viewing effect and the user experience.

Figure 12:
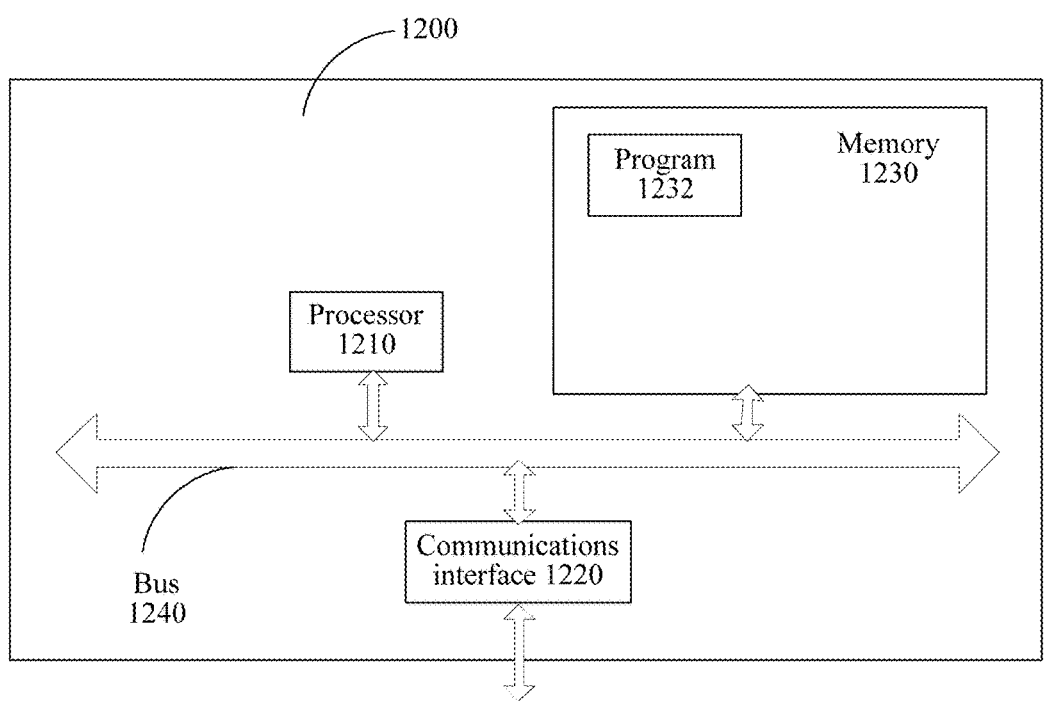
FIG. 12 is a logic block diagram of a third light field display control apparatus according to an embodiment of the present application.

FIG. 12 is a structural block diagram of a third light field display control apparatus according to an embodiment of the present application, and a specific implementation manner of a light field display control apparatus 1200 is not limited in the specific embodiment of the present application. As shown in FIG. 12, the light field display control apparatus 1200 may comprise:

A processor 1210, a communications interface 1220, a memory 1230, and a communications bus 1240, where:

The processor 1210, the communications interface 1220, and the memory 1230 communicate with each other through the communications bus 1240.

The communications interface 1220 is configured to communicate with, for example, a device having a communication function, an external light source, and the like.

The processor 1210 is configured to execute a program 1232, and specifically may execute relevant steps in any embodiment of the light field display control method.

For example, the program 1232 may comprise a program code. The program code comprises a computer operating instruction.

The processor 1210 may be a central processing unit (CPU) or an Application Specific Integrated Circuit (ASIC), or be configured to be one or more integrated circuits configured to implement the embodiments of the present application.

The memory 1230 is configured to store the program 1232. The memory 1230 may comprise a Random Access Memory (RAM) and may also further comprise a non-volatile memory, for example, at least one magnetic disk memory.

For example, in an optional implementation manner, the processor 1210 may execute the program 1232 to execute the following steps: determining a first display region of a display of a light field display device at least according to target vision adjustment range information; adjusting display pixel density distribution of the display, to cause that display pixel density distribution of the first display region in the display after the adjustment is different from that of another display region of the display; performing sampling processing on a first light field image according to actual location information of display pixels of the display after the adjustment, the first light field image being corresponding to vision information in the target vision adjustment range and related to a source image; and displaying, by the light field display device after the adjustment, the first light field image undergone the sampling processing.

In other optional implementation manner, the processor 1210 may further execute the program 1232 to execute steps mentioned in any other embodiment, which is not repeated herein.

Specific implementations of all steps in the program 1232 may be referred to in the corresponding descriptions of the corresponding steps, modules, sub-modules or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

An embodiment of the present application further provides a light field display device, comprising: a display, a lenslet array, and a light field display control apparatus. The light field display control apparatus may be any light field display control apparatus provided in the embodiments of the present application, and can perform display control on an image by executing any light field display control method provided in the embodiments of the present application in a process involving an application comprising, but not limited to, image presentation and video playback. The presentation form of the device of the light field display control apparatus is not limited, for example, the light field display control apparatus may be a certain independent component, and the component cooperatively communicates with a light field display device comprising a display; or the light field display control apparatus may be integrated in a display device comprising a display as a certain functional module, and the light field display device may comprise, but not limited to, a device having a light field display capability and comprising the display, such as a television, a computer, a camera, a mobile phone, and a video recorder.

In addition to the light field display control apparatus, specific structures of components required by light field display and comprised in the light field display device are not limited, may be a light field display device for certain near-field or remote-field display, and according to a specific form of the light field display device, may be, for example, a wearable near-field display device, a naked eye visible remote-field display device, or the like, which are not limited in the embodiment of the present application.

Figure 13:
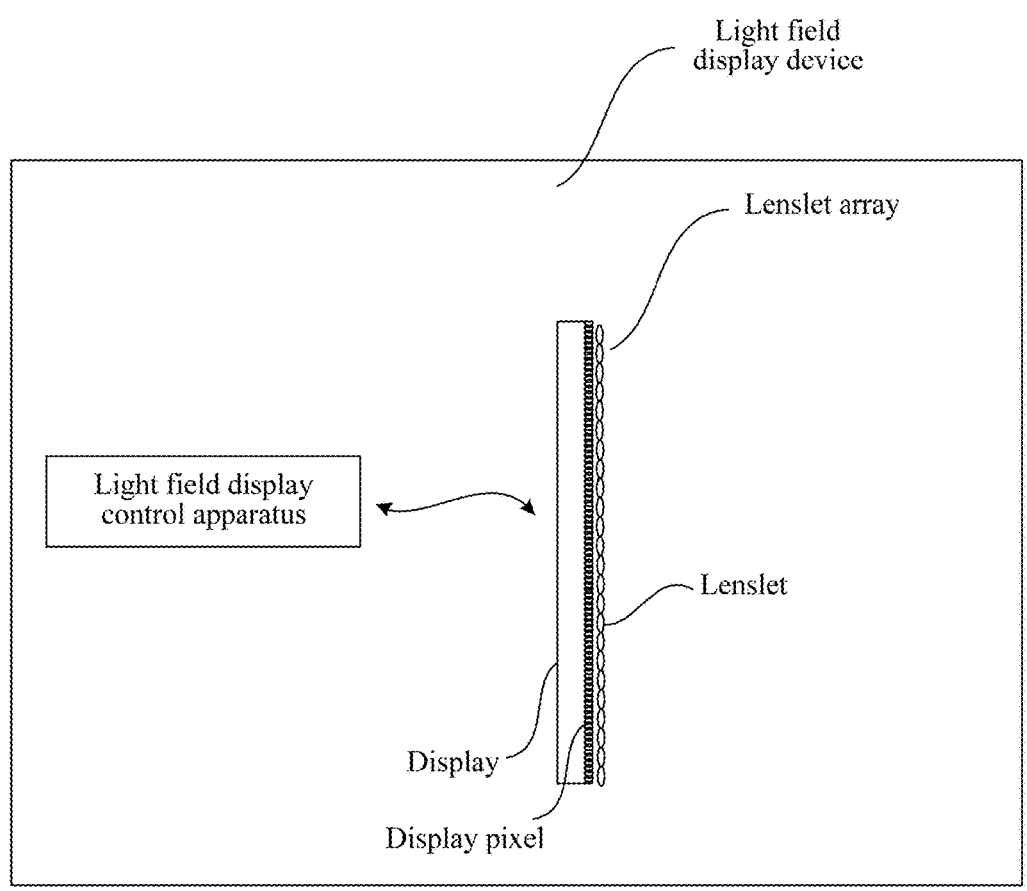
FIG. 13 is a schematic structural diagram of a light field display device according to an embodiment of the present application.

Optionally, as shown in FIG. 13, the display of the light field display device comprises multiple display regions, and one of the display regions comprises multiple display pixels. The lenslet array is disposed to be close to the display; and the lenslet array comprises multiple lenslets, and one of the lenslets is corresponding to at least one of the display regions. The light field display control apparatus may be any light field display control apparatus provided in the embodiments of the present application, and the light field display control apparatus is in communication connection with the display.

The display may use the flexible display as described above. Or, the display may further comprise: multiple display pixels distributed in an array; and a controllable deformation material part, connected to the multiple display pixels respectively, wherein the controllable deformation material part may deform under the action of an external field, ad density distribution of the multiple display pixels is adjusted correspondingly through the deformation, and the external field is controlled by the light field display control apparatus.

The structure of the display may be obtained with reference to the corresponding records of FIG. 1*b* to FIG. 1*j*, and the imaging control apparatus may directly control the external field to control the deformation of the controllable deformation material part, thereby adjusting the pixel density distribution of the display; or, the imaging control apparatus may control the external field indirectly by controlling the deformation material part, such that the controllable deformation material part deforms correspondingly to correspondingly adjust the pixel density distribution of the display; and the like. A physical connection manner of the display pixel and the deformation material part may be determined according to actual requirements, as long as the pixel density distribution of the display can be adjusted when the deformation material part is deformed, which is not limited in the embodiment of the present application, and a specific implementation manner may be obtained with reference to the corresponding records in the foregoing. The optical path structure of the light field display device, the effect description of the corresponding technical solution, and the effect description of the corresponding technical solution of the light field display control apparatus may be obtained with reference to the corresponding drawings and the text records in the method embodiment part, and are not repeated herein.

In the technical solution provided in the embodiment of the present application, the pixels of the display of the light field display device may be fully used to adjust contributions of light field image information displayed by different display regions of the display on a refocusing precision of the refocusing range. For example, the display pixel density of the first display region is improved to improve the abundance of the light field image information displayed by the first display region, thereby improving the refocusing precision of the refocusing range (the target vision adjustment range) corresponding to the first display region, to cause that there are more refocused focal points in the target vision adjustment range, thereby improving the vision correction precision of viewing an image by users of different vision information with naked eyes in the target vision adjustment range.

In the embodiments of the present application, the serial number and/or sequence of the embodiments is merely used for description, and is not intended to represent merits of the embodiments. The descriptions on the embodiments have their respective emphasis, and for a part that is not described in detail in a certain embodiment, reference may be made to related description in another embodiment. For related descriptions of implementation principles or processes related to the apparatus, device or system embodiments, reference may be made to the records of the corresponding method embodiments, which are not repeated herein.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present application. The aforementioned storage medium comprises: any medium that can store program codes, such as a USB disk, a removable hard disk, a read-only memory (ROM), a random access memory (RAM), a magnetic disk, or an optical disc.

In the embodiments of the apparatus, method and system of the present application, apparently, each component (such as the system, sub-system, module, sub-module, unit, and sub-unit) or each step may be decomposed, combined and/or combined after being decomposed. The decomposition and/or re-combination should be considered as an equivalent solution of the present application. Meanwhile, in the description of the specific embodiments of the present application, a feature described and/or shown for one implementation manner may be used in one or more other implementation manners in an identical or similar way, may be combined with a feature in another implementation manner, or may replace a feature in another implementation manner.

It should be emphasized that the term "comprise/contain" used in this text to indicate existence of a feature, element, step or component, and does not exclude existence or addition of one or more other features, elements, steps or components.

Finally, it should be noted that: the aforementioned description of the implementation manners are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A light field display control method, comprising:
    determining a first display region of a display of a light field display device according to target vision adjustment range information;
    adjusting display pixel density distribution of the display, to cause that display pixel density distribution of the first display region in the display after the adjustment is different from that of another display region of the display;
    performing sampling processing on a first light field image according to location information of display pixels of the display after the adjustment, the first light field image being corresponding to vision information in the target vision adjustment range and related to a source image; and
    displaying, by the light field display device after the adjustment, the first light field image undergone the sampling processing.

2. The method of claim 1, further comprising: determining the target vision adjustment range according to vision information of a user.

3. The method of claim 1, further comprising: pre-processing the source image according to the vision information of the user to obtain the first light field image.

4. The method of claim 1, wherein, the determining a first display region of a display of a light field display device according to target vision adjustment range information comprises:

determining, according to the target vision adjustment range, a first display sub-region to be adjusted respectively in at least one display region of the display as the first display region.

5. The method of claim 4, wherein the first display sub-region to be adjusted in the display region is an annular region having a certain radial width in the display region.

6. The method of claim 4, wherein before and after the display region undergoes display density pixel adjustment, the display pixels of the display region keep unchanged but the display pixel density distribution is changed.

7. The method of claim 1, wherein, the determining a first display region of a display of a light field display device according to target vision adjustment range information comprises:
determining the first display region according to the target vision adjustment range and a first region of the source image, and the first region being a part of the source image.

8. The method of claim 7, wherein the determining the first display region according to the target vision adjustment range and the first region of the source image comprises:
determining multiple second light field images according to the target vision adjustment range, the second light field image being corresponding to vision adjustment information in the target vision adjustment range and related to the source image; and
determining light field sub-image information corresponding to the first region in the multiple second light field images; and
determining a display region in the display that affects displaying of the light field sub-image information as the first display region.

9. The method of claim 7, wherein the determining the first display region according to the target vision adjustment range and the first region of the source image comprises:
determining the first display region according to multiple pieces of vision information in the target vision adjustment range and relative location information of pixels in the first region relative to a reference point of the source image.

10. The method of claim 7, further comprising determining the first region of the source image.

11. The method of claim 10, wherein the determining the first region of the source image comprises:
acquiring region of interest information; and
determining the first region of the source image according to the region of interest information.

12. The method of claim 10, wherein the determining the first region of the source image comprises:
performing image analysis on the source image; and
determining the first region of the source image according to a result of the image analysis.

13. The method of claim 1, wherein the adjusting the display pixel density distribution of the display comprises:
determining target pixel density distribution information according to the first display region, wherein in the target pixel density distribution information, a target pixel density corresponding to the first display region is different from a target pixel density corresponding to another display region; and
adjusting the display pixel density distribution of the display according to the target pixel density distribution information.

14. The method of claim 13, wherein the adjusting the display pixel density distribution of the display according to the target pixel density distribution information comprises:

determining deformation control information of a controllable deformation material part according to the target pixel density distribution information; and
controlling, according to the deformation control information, the controllable deformation material part to deform, so as to adjust the display pixel density distribution of the display correspondingly through the deformation of the controllable deformation material part.

15. The method of claim 14, wherein the controllable deformation material part is at least made of one or more of the following controllable deformation materials: a piezoelectric material, an electroactive polymer, a photoinduced deformation material, and a magnetostrictive material.

16. The method of claim 1, further comprising: performing a balanced control on display brightness of different display regions of the display in a process that the light field display device after the adjustment displays the light field image undergone the sampling processing.

17. A light field display control apparatus, comprising:
a display region determining module, configured to determine a first display region of a display of a light field display device according to target vision adjustment range information;
a display pixel density distribution adjusting module, configured to adjust display pixel density distribution of the display, to cause that display pixel density distribution of the first display region in the display after the adjustment is different from that of another display region of the display;
an image sampling processing module, configured to perform sampling processing on a first light field image according to location information of display pixels of the display after the adjustment, the first light field image being corresponding to vision information in the target vision adjustment range and related to a source image; and
a light field display module, configured to display, by the light field display device after the adjustment, the first light field image undergone the sampling processing.

18. The apparatus of claim 17, further comprising:
a vision adjustment range information determining module, configured to determine the target vision adjustment range according to vision information of a user.

19. The apparatus of claim 17, further comprising:
a source image pre-processing module, configured to pre-process the source image according to the vision information of the user to obtain the first light field image.

20. The apparatus of claim 17, wherein the display region determining module comprises:
a first display region determining sub-module, configured to determine, according to the target vision adjustment range, a first display sub-region to be adjusted respectively in at least one display region of the display as the first display region.

21. The apparatus of claim 20, wherein the first display sub-region to be adjusted in the display region is an annular region having a certain radial width in the display region.

22. The apparatus of claim 20, wherein before and after the display region undergoes display density pixel adjustment, the display pixels of the display region keep unchanged but the display pixel density distribution is changed.

23. The apparatus of claim 17, wherein the display region determining module comprises:

a second display region determining sub-module, configured to determine the first display region according to the target vision adjustment range and a first region of the source image, and the first region being a part of the source image.

24. The apparatus of claim 23, wherein the second display region determining sub-module comprises:
a light field image determining unit, configured to determine multiple second light field images according to the target vision adjustment range, the second light field image being corresponding to vision adjustment information in the target vision adjustment range and related to the source image;
a light field sub-image determining unit, configured to determine light field sub-image information corresponding to the first region in the multiple second light field images; and
a first display region determining unit, configured to determine a display region in the display that affects displaying of the light field sub-image information as the first display region.

25. The apparatus of claim 23, wherein the second display region determining sub-module comprises:
a second display region determining unit, configured to determine the first display region according to multiple pieces of vision information in the target vision adjustment range and relative location information of pixels in the first region relative to a reference point of the source image.

26. The apparatus of claim 23, further comprising:
a first region determining module, configured to determine a first region of the source image.

27. The apparatus of claim 26, wherein the first region determining module comprises:
a region of interest information determining sub-module, configured to acquire region of interest information; and
a region of interest determining sub-module, configured to determine the first region of the source image according to the region of interest information.

28. The apparatus of claim 26, wherein the first region determining module comprises:
an image analyzing sub-module, configured to perform image analysis on the source image; and
an image analysis result determining sub-module, configured to determine the first region of the source image according to an analysis result of the source image.

29. The apparatus of claim 17, wherein the display pixel density distribution adjusting module comprises:
a target pixel density distribution information determining sub-module, configured to determine target pixel density distribution information according to the first display region, wherein in the target pixel density distribution information, a target pixel density corresponding to the first display region is different from a target pixel density corresponding to another display region; and
a display pixel density distribution adjusting sub-module, configured to adjust the display pixel density distribution of the display according to the target pixel density distribution information.

30. The apparatus of claim 29, wherein the display pixel density distribution adjusting sub-module comprises:
a deformation control information determining unit, configured to determine deformation control information of a controllable deformation material part according to the target pixel density distribution information; and a deformation controlling unit, configured to control, according to the deformation control information, the controllable deformation material part to deform, so as to adjust the display pixel density distribution of the display correspondingly through the deformation of the controllable deformation material part.

31. The apparatus of claim 30, wherein the controllable deformation material part is at least made of one or more of the following controllable deformation materials: a piezoelectric material, an electroactive polymer, a photoinduced deformation material, and a magnetostrictive material.

32. The apparatus of claim 17, further comprising:
a brightness balanced control module, configured to perform a balanced control on display brightness of different display regions of the display in a process that the light field display device after the adjustment displays the light field image undergone the sampling processing.

33. A light field display device, comprising:
a display;
a lenslet array; and
the light field display control apparatus of claim 17, the light field display control apparatus being in communication connection with the display.

34. The light field display device of claim 33, wherein:
the display comprises multiple display regions, one of the display regions comprising multiple display pixels; and
the lenslet array is disposed to be close to the display, comprises multiple lenslets, and one of the lenslets is corresponding to at least one of the display regions.

35. The light field display device of claim 33, wherein the display comprises:
multiple display pixels distributed in an array; and
a controllable deformation material part, connected to the multiple display pixels respectively, wherein the controllable deformation material part deforms under the action of an external field, density distribution of the multiple display pixels is adjusted correspondingly through the deformation, and the external field is controlled by the light field display control apparatus.

36. A computer readable storage apparatus, comprising at least one executable instruction, which, in response to execution, causes a processor to perform a light field display control method, comprising:
determining a first display region of a display of a light field display device according to target vision adjustment range information;
adjusting display pixel density distribution of the display, to cause that display pixel density distribution of the first display region in the display after the adjustment is different from that of another display region of the display;
performing sampling processing on a first light field image according to location information of display pixels of the display after the adjustment, the first light field image being corresponding to vision information in the target vision adjustment range and related to a source image; and
displaying, by the light field display device after the adjustment, the first light field image undergone the sampling processing.

37. A light field display control apparatus, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations, comprising:
- determining a first display region of a display of a light field display device according to target vision adjustment range information;
- adjusting display pixel density distribution of the display, to cause that display pixel density distribution of the first display region in the display after the adjustment is different from that of another display region of the display;
- performing sampling processing on a first light field image according to location information of display pixels of the display after the adjustment, the first light field image being corresponding to vision information in the target vision adjustment range and related to a source image; and
- displaying, by the light field display device after the adjustment, the first light field image undergone the sampling processing.

* * * * *